(12) United States Patent
Komine et al.

(10) Patent No.: US 8,810,364 B2
(45) Date of Patent: *Aug. 19, 2014

(54) SYSTEM FOR MONITORING COMPONENT OF OPERATING MACHINE

(75) Inventors: Atsutomo Komine, Late of Minato-ku (JP); Michiko Komine, legal representative, Miura-gun (JP); Keisuke Komine, legal representative, Yokohama (JP); Chihiro Saito, legal representative, Kawasaki (JP); Yukihiro Tsuda, Minato-ku (JP); Hidenori Koizumi, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 825 days.

This patent is subject to a terminal disclaimer.

(21) Appl. No.: 12/308,766

(22) PCT Filed: Jul. 6, 2007

(86) PCT No.: PCT/JP2007/063600
§ 371 (c)(1),
(2), (4) Date: Mar. 17, 2009

(87) PCT Pub. No.: WO2008/007625
PCT Pub. Date: Jan. 17, 2008

(65) Prior Publication Data
US 2010/0013594 A1 Jan. 21, 2010

(51) Int. Cl.
*G08B 29/00* (2006.01)
*H04Q 5/22* (2006.01)
*G08B 23/00* (2006.01)
*G08B 5/00* (2006.01)
*B60Q 1/26* (2006.01)
*B60R 25/10* (2013.01)
*B60Q 1/00* (2006.01)

(52) U.S. Cl.
USPC ...... 340/5.8; 340/438; 340/572.1; 340/572.4; 340/426.1; 340/10.3; 340/10.1; 340/520; 340/691.1; 340/463; 340/426.24; 340/426.15; 340/425.5

(58) Field of Classification Search
USPC .............. 340/438, 572.1, 572.4, 426.1, 10.3, 340/10.1
See application file for complete search history.

(56) References Cited

U.S. PATENT DOCUMENTS

| | | | |
|---|---|---|---|
| 6,558,444 B1 | 5/2003 | Hunter | |
| 6,748,182 B2 * | 6/2004 | Yoshida et al. | 399/12 |
| 7,177,553 B2 * | 2/2007 | Ono | 399/12 |
| 7,420,467 B2 * | 9/2008 | Patenaude et al. | 340/572.1 |
| 2002/0032511 A1 | 3/2002 | Murakami et al. | |
| 2002/0085847 A1 * | 7/2002 | Yoshida et al. | 399/12 |

(Continued)

FOREIGN PATENT DOCUMENTS

| | | |
|---|---|---|
| JP | U-02-000033 | 1/1990 |
| JP | 11-287140 A | 10/1999 |

(Continued)

OTHER PUBLICATIONS

International Search Report mailed on Oct. 9, 2007 for the corresponding International patent application No. PCT/JP2007/063600 (English translation enclosed).

*Primary Examiner* — Steven Lim
*Assistant Examiner* — Muhammad Adnan
(74) *Attorney, Agent, or Firm* — Posz Law Group, PLC

(57) ABSTRACT

A working machine is provided with a plurality of exchangeable components, and each component is provided with a wireless tag. A component ID is stored in advance in the wireless tag. When, on the side of the working machine, a component exchange timing or an engine starting timing is detected, the component ID stored in the wireless tag is acquired, and is transmitted to a working machine management device. The working machine management device checks the component ID which has been received from the working machine and a component ID which is stored in a component ID storage means against one another. And, if these two component IDs do not match one another, an abnormal state detection means outputs a warning signal.

4 Claims, 16 Drawing Sheets

(56) References Cited

U.S. PATENT DOCUMENTS

| | | | |
|---|---|---|---|
| 2003/0006281 A1* | 1/2003 | Thomas et al. | 235/385 |
| 2003/0169149 A1* | 9/2003 | Ohki et al. | 340/5.8 |
| 2003/0174099 A1* | 9/2003 | Bauer et al. | 343/893 |
| 2005/0035852 A1* | 2/2005 | Paulsen | 340/438 |
| 2005/0143883 A1 | 6/2005 | Yamagiwa | |
| 2005/0244169 A1* | 11/2005 | Ono | 399/12 |

FOREIGN PATENT DOCUMENTS

| | | | |
|---|---|---|---|
| JP | 2000-233719 A | | 8/2000 |
| JP | 2002-334134 A | | 11/2002 |
| JP | 2002334134 A | * | 11/2002 |
| JP | 2004-062675 A | | 2/2004 |
| JP | 2004-341614 A | | 12/2004 |
| JP | 2005-050022 A | | 2/2005 |
| JP | 2005-135313 A | | 5/2005 |
| JP | 2005157767 A | * | 6/2005 |
| JP | A-2005-190013 | | 7/2005 |
| JP | A-2005-196234 | | 7/2005 |
| JP | A-2005-196235 | | 7/2005 |
| JP | A-2005-273196 | | 10/2005 |
| JP | 2006-096428 A | | 4/2006 |

* cited by examiner

FIG. 6

| COMPONENT ID MANAGEMENT TABLE (T1) |||
|---|---|---|
| PRODUCT NUMBER (T11) | SERIAL NUMBER (T12) | CHASSIS NUMBER (T13) |
| PN1 | SN11 | MN1 |
| | SN12 | MN2 |
| | ... | ... |
| | SN1n | UNUSED |
| PN2 | SN21 | MN1 |
| | SN22 | MN2 |
| | ... | ... |
| | SN2n | UNUSED |
| ... | | |
| PNn | SNn1 | MN1 |
| | SNn2 | MN2 |
| | ... | ... |
| | SNnn | UNUSED |
| PN1 | | |
| PN2 | | |
| ... | | |
| PNn | | |
| ... | | |

FIG. 15

| COMPONENT ID MANAGEMENT TABLE — T1 | | |
|---|---|---|
| PRODUCT NUMBER — T11 | SERIAL NUMBER — T12 | CHASSIS NUMBER — T13 |
| PN1 | ~~SN11~~ | MN1 |
|  | SN12 | MN2 |
|  | ... | ... |
|  | SN1n | UNUSED |
| PN2 | SN21 | MN1 |
|  | ~~SN22~~ | MN2 |
|  | ... | ... |
|  | SN2n | UNUSED |
| ... | | |
| PNn | ~~SNn1~~ | MN1 |
|  | SNn2 | MN2 |
|  | ... | ... |
|  | SNnn | UNUSED |
| PN1 | | |
| PN2 | | |
| ... | | |
| PNn | | |
| ... | | |

SYSTEM FOR MONITORING COMPONENT OF OPERATING MACHINE

CROSS REFERENCE TO RELATED APPLICATIONS

This application is a U.S. national stage application of PCT/JP2007/063600 filed on Jul. 6, 2007, and claims priority to, and incorporates by reference, Japanese Patent Application No. 2006-190172, filed on Jul. 11, 2006.

TECHNICAL FIELD

The present invention relates to a system for monitoring components of a working machine.

BACKGROUND ART

As working machines there are known various types of working machines such as, for example, hydraulic shovels and wheel loaders and the like, or various types of haulage vehicle such as dump trucks or the like. Yet further demands for exhaust gas purification are being made upon such working machines. Therefore purification of their exhaust gases is pursued by using components which are designed and manufactured at higher accuracy, and by controlling their engines at a higher level.

As one example, the case of filters will be explained. In order to perform high accuracy engine control, good quality fuel and good quality engine oil are required. Due to this, high performance fuel filters and oil filters are used, which can eliminate more minute dirt and moisture and so on.

Since these kinds of high performance filters are higher priced as compared to conventional filters, counterfeit products and poor quality goods can easily appear upon the market. If an inferior or counterfeit product is used, it is not possible to get the anticipated engine performance, and it is not possible to obtain purified exhaust gases. Moreover, if the use of low performance or counterfeit products is continued, there is also a possibility of causing damage to the fuel injection device or to the engine itself, and the service life may be deteriorated.

In recent years, IC tags which are capable of wireless communication have come into use, and have been proposed for performing authentication processing and goods management. As a first prior art technique, it is known to use an IC tag as a remote key, and to cancel locking of an engine when a user who possesses the IC tag approaches a vehicle (refer to Patent Document #1). And, as a second prior art technique, it is known to attach IC tags to books, and to prevent books which have not been paid for being carried out of a shop by exchanging signals with the IC tags at a security gate (refer to Patent Document #2).

As a third prior art technique, a component management information system is also known in which memories which store component information are attached to components in advance, and in which it is arranged for it to be possible to build data bases which are at the same level on the side of a machine and on the side of an information manager by, when a component different from the one shipped from the factory is fitted to a machine, transmitting information about that component from the machine to a server (refer to Patent Document #3).

As a fourth prior art technique, it is also known to attach to a filter a tag in which information is stored which shows that the filter is a genuine product, and to decide whether or not a filter is a genuine product by a controller reading out the information which is stored in the tag (refer to Patent Document #4).

Patent Document #1: Japanese Laid-Open Patent Publication 2000-233719;
Patent Document #2: Japanese Laid-Open Patent Publication 2005-135313;
Patent Document #3: Japanese Laid-Open Patent Publication 2004-062675;
Patent Document #4: Japanese Patent Publication 2002-531237.

DISCLOSURE OF THE INVENTION

Problems to be Solved by the Invention

With these prior art techniques described in the above documents, although IC tags which are capable of wireless communication are used, it is not possible to apply them just as they are to component management for a working machine. In the first prior art technique, since only remote actuation of engine locking is performed, accordingly it is fundamentally possible to release the engine locking with only one IC tag. By contrast, components of many different types are used upon a working machine, and moreover, for each type of component, a large number of genuine components exist. In other words, with working machines, for the same type of component, it is possible to use many different ones even if their manufacturing serial numbers are different, so that there is a one-to-many relationship.

With the second prior art technique, no decision is made as to whether the books to which the IC tags are attached are real or fake, since the technique is only used for managing whether or not accurate track has been kept.

The third prior art technique is only for reflecting the current component structure in the shifting machine in the data base upon the server, and there is no aspect of monitoring whether or not they are genuine products. And, with the fourth prior art technique, the decision as to whether or not the components are genuine products is made on the side of the machine, so that again there is no aspect of the management device monitoring, over the network, whether or not they are genuine products.

Furthermore, since with none of these prior art techniques is any consideration given to countermeasures in the event of an IC tag itself being illegally copied, accordingly it is not possible to monitor whether or not the components are genuine products, and it is not possible to take appropriate measures.

Moreover, with the various prior art techniques described above, the location in which the IC tags are used is the same as, or is close to, the location in which the authentication which uses the IC tags is performed, and absolutely no consideration is given to managing a plurality of IC tags in separated locations in a coordinated manner.

The present invention has been conceived in consideration of the problems described above, and an object thereof is to provide a system for monitoring components for a working machine, in which it is arranged for it to be possible to decide whether or not the components which are used for a working machine are genuine components, and to detect the use of components other than genuine components; and moreover to detect the use of a wireless tag to which component identification information has been illegally copied by checking component identification information which has been used once, and to issue a warning in that event. Another object of the present invention is to provide a system for monitoring components for a working machine which is capable of managing components with a comparatively simple control structure, by deciding whether or not the components are genuine at the time that they are exchanged. Yet further objects of the present invention will become clear from the following description of embodiments thereof.

Means for Solving the Problems

According to one aspect of the present invention, a component monitoring system for a working machine is a system for monitoring a component which can be exchangeably mounted to a working machine, comprising a control device which is provided to the working machine, and a management device which is connected to this control device via a communication network so as to be capable of mutual communication therewith, wherein: a wireless tag, in which first component identification information for identifying this component is stored, is provided in advance to the component; the control device comprises: a checking timing detection means for detecting whether or not a checking timing, which has been set in advance, has arrived; and a component identification information acquisition means which, if the checking timing has arrived, acquires the first component identification information from the wireless tag via an information reading means, and transmits the first component identification information which has been acquired to the management device via the communication network; and the management device comprises: a component information management means for managing second component identification information related to genuine components; a component monitoring means which decides whether the first component identification information which has been received from the control device and the second component identification information which is managed by the component information management means agree with one another or not, and which, if the first component identification information and the second component identification information do not agree with one another, outputs a decision result to the effect of non-agreement; and an updating means which, if it has been decided by the component monitoring means that the first component identification information and the second component identification information agree with one another, updates the contents stored in the component information management means so that the second component identification information, for which this agreement has been decided, is not re-used by the component monitoring means.

In a preferred embodiment, the checking timing detection means detects the checking timing if either the component is exchanged, or starting of the engine is requested.

In a preferred embodiment, the control device comprises an abnormal state control means which acquires the decision result to the effect of non-agreement from the management device, and outputs abnormal state detection information on the basis of this decision result which has been acquired.

In a preferred embodiment, a product number information item for specifying the type of the component is included in the first and second component identification information; and the component monitoring means checks the product number information item which is included in the first component identification information, and the product number information item which is included in the second component identification information.

In a preferred embodiment, a product number information item for specifying the type of the component, and a manufacturing serial number which is specific to the component, are included in the first and second component identification information; and the component monitoring means checks the product number information item and the manufacturing serial number which are included in the first component identification information, and the product number information item and the manufacturing serial number which are included in the second component identification information.

In a preferred embodiment, the component identification information acquisition means transmits a chassis number for identifying the working machine to the management device in correspondence with the first component identification information; and the component information management means manages the chassis number in correspondence with the second component identification information.

In a preferred embodiment, in the first and second component identification information, there are included a product number information item for specifying the type of the component, and a manufacturing serial number which is specific to the component; and the component monitoring means checks the product number information item and the manufacturing serial number which are included in the first component identification information, and the product number information item and the manufacturing serial number which are included in the second component identification information, and: deletes the manufacturing serial number which is included in the second component identification information from the component information management means via the updating means, if the product number information items and the manufacturing serial numbers both agree with one another; and notifies the control device, if either the product number information items or the manufacturing serial numbers do not agree with one another.

In a preferred embodiment, in the first and second component identification information, there are included a product number information item for specifying the type of the component, and a manufacturing serial number which is specific to the component; and the component identification information acquisition means transmits a chassis number for identifying the working machine to the management device in correspondence with the first component identification information; and the component monitoring means transmits to the control device, if any of: (1) the product number information item included in the first component identification information and the product number information item included in the second component identification information do not agree with one another; or (2) the manufacturing serial number included in the first component identification information and the manufacturing serial number included in the second component identification information do not agree with one another; or (3) if the component information management means is holding the chassis number in correspondence with the manufacturing serial number included in the second component identification information, if the chassis number which is held in correspondence with the manufacturing serial number included in the second component identification information and the chassis number corresponding to the first component identification information do not agree with one another.

In a preferred embodiment, the component is a component for an engine, which is used by the engine, and the information reading means is provided in the vicinity of the component.

In a preferred embodiment, when the component is supplied to the working machine, the updating means updates the second component identification information which is stored in the component information management means to its newest state by acquiring the newest second component identification information related to this component which is supplied.

In a preferred embodiment, the abnormal state detection information is warning information.

In a preferred embodiment, the abnormal state detection information is information for limiting the operation of the working machine.

In a preferred embodiment, the abnormal state detection information is information for limiting the output of an engine of the working machine.

According to another aspect of the present invention, a component monitoring system for a working machine is a management device which is connected via a communication network to a control device provided to the working machine so as to be capable of mutual communication therewith, wherein: a wireless tag, in which is stored first component identification information for identifying a component which can be exchangeably mounted to the working machine, is provided in advance to this component; and the first component identification information is acquired by the control device; and comprising: a component information management means for managing second component identification information related to genuine components; a component monitoring means which receives the first component identification information which has been acquired and transmitted by the control device, decides whether the second component identification information which is managed by the component information management means and the first component identification information agree with one another or not, and, if the first component identification information and the second component identification information do not agree with one another, outputs a decision result to the effect of non-agreement; and an updating means which, if it has been decided by the component monitoring means that the first component identification information and the second component identification information agree with one another, updates the contents stored in the component information management means so that the second component identification information, for which this agreement has been decided, is not re-used by the component monitoring means.

Advantages of the Invention

According to the present invention, it is possible to compare together the first component identification information which has been read out from the wireless tag and the second component identification information which is managed by the component information management means, and it is possible to detect if the two of them do not agree with one another. Accordingly, if some counterfeit product or the like other than a genuine component is used, it is possible, for example, to emit a warning to the user or to limit the operation of the working machine, on the basis of the decision result which is outputted from the management device to the effect that these two items of identification information do not agree with one another. Moreover, it is possible to prevent damage or the like being caused to the various portions of the working machine by the use of this counterfeit product or the like, before it even happens. Furthermore since, according to the present invention, the contents stored in the component information management means is updated so that second component identification information, for which it has been decided that it agrees with first component identification information, is not re-used by the component monitoring means, accordingly it is possible to prevent the re-use of component identification information which has once been authenticated, before it even happens.

According to the present invention, the detection of the checking timing is performed by the control device, and the decision as to whether or not the first component identification information and the second component identification information agree with one another and so on is performed by the management device. Accordingly, it is possible to monitor component groups which are used with each of a plurality of working machines in a unified manner with the management device, so that the convenience of use is enhanced. Moreover, it is possible to decide whether or not groups of components for a plurality of working machines are genuine components, only by updating the second component identification information which is stored by the component information management means to its newest version.

According to the present invention, if the product number information and the manufacturing serial numbers are both in agreement, the manufacturing serial number which is included in the second component identification information is deleted from the component information management means; while, if either the product number information or the manufacturing serial numbers are not in agreement, then it is possible to limit the operation of the working machine. Accordingly since, if a genuine component has once been used, the manufacturing serial number of this genuine component is deleted from the component information management means, this implies that it is not possible to use a wireless tag to which the manufacturing serial number of this genuine component has been illegally copied. Due to this, even if information in a wireless tag which is provided to a genuine component is illegally copied, it is possible to prevent the usage of a counterfeit product or the like which possesses this illegal wireless tag, before it even happens.

Since, according to the present invention, it is possible to distinguish whether or not a component is a genuine component at the time of component exchange, accordingly it is possible to manage whether or not components which are attached to a working machine are real or false, in an appropriate manner.

According to the present invention, all these cases are detected: if the product number information which is included in the first component identification information and the product number information which is included in the second component identification information do not agree with one another; or if the manufacturing serial number which is included in the first component identification information and the manufacturing serial number which is included in the second component identification information do not agree with one another; or if the chassis number which is set in correspondence with the manufacturing serial number included in the second component identification information and the chassis number which is set in correspondence with the first component identification information do not agree with one another. Accordingly, if the same manufacturing serial number has been transmitted from control devices of separate working machines to the management device, it is possible to notify at least one or the other of the control devices to the effect that an abnormal state has been detected. Due to this, it is possible to prevent the state of affairs occurring that a counterfeit product or the like possessing a wireless tag which has been illegally copied is fitted to a different working machine than the working machine upon which the genuine component is being used.

According to the present invention, when a component is supplied to a working machine, the second component identification information which is stored in the component information management means is updated to its newest state by the updating means acquiring the newest second component identification information related to this component which has been supplied. Accordingly, for example, before a component which is shipped from the component supply factory or the like is fitted to the working machine, it is possible to update the second component identification information which is managed by the component information management means to its newest state, so that it is possible to prevent the usage of counterfeit products or the like.

BRIEF DESCRIPTION OF THE DRAWINGS

FIG. 6 is a structural diagram of a component ID management table;

FIG. 15 is a structural diagram of a component ID management table; and

BEST MODE FOR CARRYING OUT THE INVENTION

Figure 1:
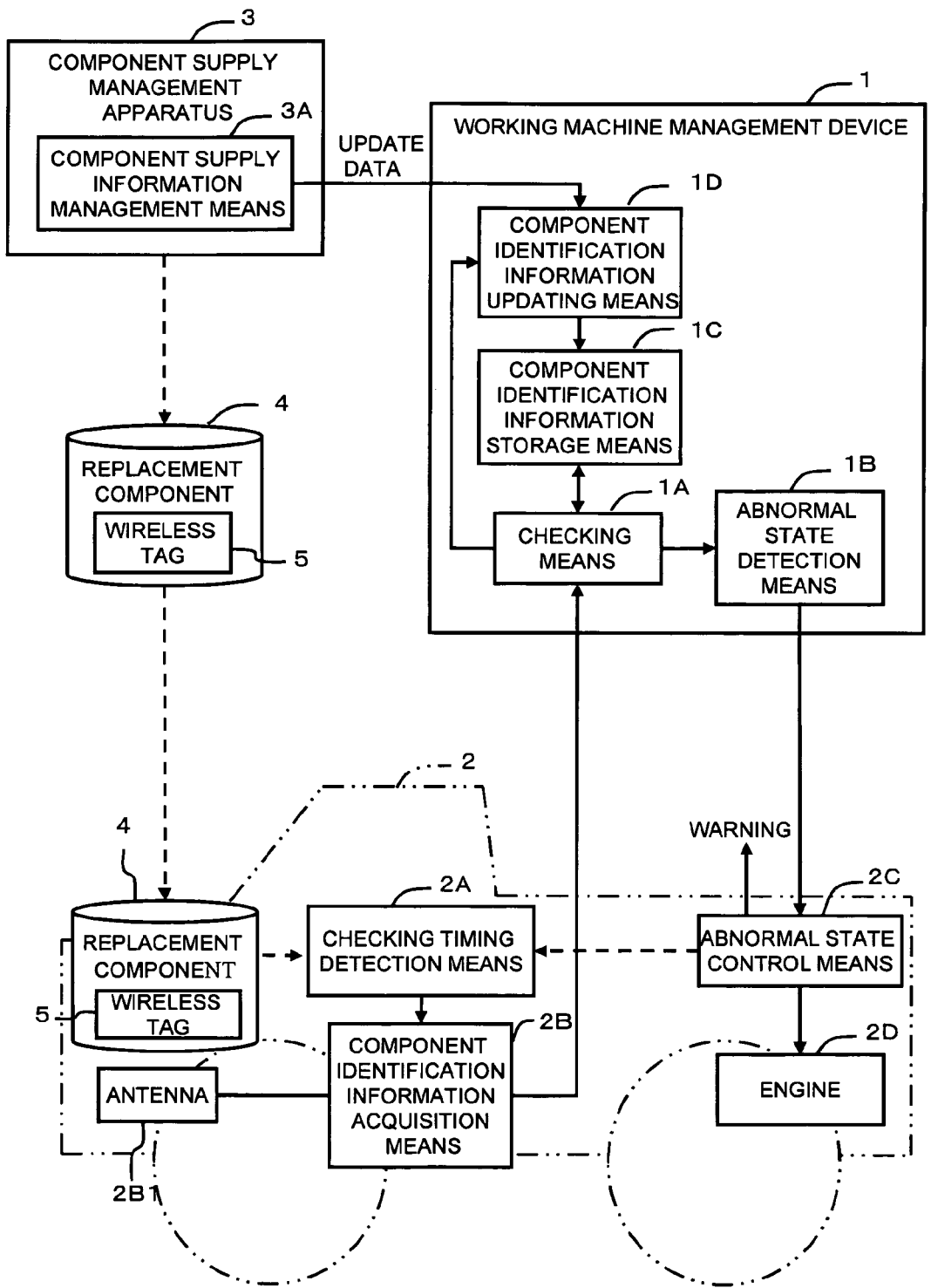
FIG. 1 is an explanatory figure showing the overall concept of an embodiment of the present invention.

In the following, embodiments of the present invention will be described in detail with reference to the drawings. FIG. 1 is an explanatory figure showing the overall concept of the present invention. The component monitoring system for a working machine according to this embodiment may, for example, include a working machine management device 1, a working machine 2 such as a wheel loader or a truck or the like, and a component supply management apparatus 3.

The working machine management device 1 is a device which, for a plurality of working machines 2, manages whether or not genuine components are being utilized in a unified manner. This working machine management device 1 may, for example, comprise a checking means 1A, an abnormal state detection means 1B, a component identification information storage means 1C, and a component identification information updating means 1D. Here, the checking means 1A and the abnormal state detection means 1B correspond to the "component monitoring means" of the Claims.

The checking means 1A is a device which compares together first component identification information which has been received from the working machine 2 and second component identification information which is stored in the component identification information storage means 1C, and decides whether or not they agree with one another. And the abnormal state detection means 1B is a device which, on the basis of the result of checking by the checking means 1A, outputs information (a signal, a command, or data) which specifies that an abnormal state has been detected. For example, if the first component identification information and the second component identification information do not agree with one another, this abnormal state detection means 1B may notify to the abnormal state control means 2C the fact that some component other than a genuine component is being used.

The component identification information storage means 1C is a device which manages the second component identification information, which is stored by wireless tags 5 which are attached to genuine components. This component identification information storage means 1C stores, for each of the working machines 2, the product numbers and so on of the genuine components which should be used for that working machine 2. It should be understood that, for the convenience of explanation, in the following description, this component identification information will be abbreviated as the "component ID" (i.e. the Parts Identification). Accordingly, for example, the first component identification information will be termed the "first component ID", the second component identification information will be termed the "second component ID", the component identification information storage means 1C will be termed the component ID storage means 1C, and the component identification information updating means 1D will be termed the component ID updating means 1D.

Here by a genuine component, is meant a component which has been supplied by an entity which possesses a valid authority related to the manufacture and sale of components 4. For example, a component 4 which is supplied the manufacturer of the working machine 2, or by an entity which has received permission from the manufacturer of the working machine 2, is a genuine component. A component 4 other than a genuine component corresponds to a counterfeit product, no matter whether its performance may be superior or inferior.

The component ID updating means 1D is a device which updates the second component ID which is stored in the component ID storage means 1C to its newest state. This component ID updating means 1D may, for example, update the stored contents of the component ID storage means 1C on the basis of update data which has been notified from the component supply management apparatus 3. In other words, when some new genuine components have been shipped from a component supply factory or the like, the component ID updating means 1D may acquire second component IDs related to these new genuine components, and may reflect them in the contents stored in the component ID storage means 1C. By doing this, before a component 4 is fitted to a working machine 2, the contents stored in the component ID storage means 1C can be updated to its newest state. Moreover, as will become clear from the embodiments described hereinafter, the component ID updating means 1D may delete a second component ID related to a component which has been already used by a working machine 2 from the component ID storage means 1C, or may establish a correspondence with information (a utilized flag or the like) which shows that a second component ID, related to a component which has been used, has been utilized. By doing this, it is possible to prevent an anomalous state of affairs from occurring in which a component 4 which has been used for any one of the working machines 2 is simultaneously being used for another one of the working machines 2 as well. In other words, even if a wireless tag 5 which is placed upon a genuine component 4 at the distribution stage is illegally copied, and the illegally copied wireless tag is attached to a counterfeit product, then it is still possible to prevent that counterfeit product from being used for any other working machine.

The working machine 2 may, for example, comprise various components 4, a checking timing detection means 2A, a component ID acquisition means 2B, an antenna 2B1, an abnormal state control means 2C, an engine 2D, and so on. Here, the components 4 are various components which can be exchanged; fuel filters, oil filters, hydraulic cylinders, hydraulic pumps, and hydraulic control valves may be cited as examples thereof. These components 4 are provided with wireless tags 5 in advance.

The "control device" may, for example, comprise the checking timing detection means 2A, the component ID acquisition means 2B, and the abnormal state control means 2C. The checking timing detection means 2A detects whether or not the timing has arrived for deciding whether or not a component 4 is a genuine component. As this checking timing, for example, the time to exchange the component 4 or the time that the engine switch is actuated or the like may be cited.

The component ID acquisition means 2B reads out the first component ID stored in the wireless tag 5 via the antenna 2B1, and transmits this first component ID to the working machine management device 1. And the component ID acquisition means 2B may set up a correspondence between a chassis number which is set for the working machine 2 in advance, and the first component ID, and may transmit this to the working machine management device 1.

The antenna 2B1 is fitted at a position in the vicinity of the component 4, so that its distance from the wireless tag 5 is a predetermined distance. And the abnormal state control means 2C performs predetermined operations on the basis of notification from the working machine management device 1. As such predetermined operations, for example, operations such as prohibiting the starting of the engine 2D, limiting the rotational speed of the engine 2D, and so on may be cited.

The component supply management apparatus 3, for example, may be provided at a component supply factory or the like, and manages the supply state of new or recycled components 4 which are supplied to the market. This component supply management apparatus 3 comprises a component supply information management means 3A. The component supply information management means 3A manages various types of information related to the supply of the components 4, such as, for example, the product numbers, the manufacturing serial numbers, the buyers, the types of applicable device, the numbers manufactured, the day of manufacture, the day of shipment, and so on of these components 4. And the component supply information management means 3A transmits information related to components 4 which have been newly shipped to the working machine management device 1.

While the structure of the wireless tags 5 will be described hereinafter, a wireless tag 5, for example, may start according to a radio wave which it has received from the external antenna 2B1, and may transmit a component ID which has been stored in that tag 5 in advance to the exterior. The wireless tag 5, for example, may be affixed to a genuine component 4 at the component manufacturing facility or the like. Information such as, for example, a product number and/or a manufacturing serial number may be stored in the wireless tag 5.

If the component 4 is a genuine component, the first component ID within its wireless tag 5 and some second component ID which is stored in the component ID storage means 1C will agree with one another. This is because, in the case of a genuine component, the component ID which is the same as the component ID written in the wireless tag 5 is transmitted from the component supply management apparatus 3 to the working machine management device 1, and is stored in the component ID storage means 1C.

If the component 4 is not a genuine component but is a counterfeit product or the like, then it is considered to be very likely that either from the start no wireless tag 5 will be provided thereto, or that, even if a wireless tag 5 is provided, a correct component ID will not be written therein. In the former case, in other words in the case of a counterfeit product to which no wireless tag 5 is provided, it is not possible to perform checking with any second component ID, since it is not possible to read out any first component ID from the side of the component 4. Accordingly, the checking means 4 reaches a decision of non-agreement. And in the latter case, in other words in the case of a counterfeit product to which a wireless tag 5 is provided in which a correct component ID is not written, again the checking means 4 reaches a decision of non-agreement, since the first component ID which has been read out from the counterfeit product or the like does not agree with any second component ID which is stored in the component ID storage means 1C.

It should be understood that the possibility must also be considered that, in the case of a higher class counterfeit product, a wireless tag may be provided in which is written a first component ID which is the same as a genuine first component ID. In other words, sometimes a genuine wireless tag 5 is itself illegally copied in its entirety. As a countermeasure in this case, there may be suggested the method of checking the first component ID of a component 4 once it has been used, and of deleting from the component ID storage means 1C the first component ID which is the same as that first component ID which has been used.

With this embodiment having the above structure, it is possible to decide whether a component 4 which is mounted to the working machine is a genuine component or not when the time for component exchange arrives or actuation of the engine switch is performed, and, if some component 4 other than a genuine component is installed, to emit a warning, or to prohibit starting of the engine 2D, or to limit the output of the engine 2D. Accordingly, it is possible to suppress the usage of any counterfeit product or the like other than a genuine component, and thereby to prevent deterioration of the performance or the life of the working machine 2, so that it is possible to maintain the reliability of the working machine 2.

In this embodiment it is possible to manage, with this working machine management device 1, whether a plurality of components 4 which are used upon a plurality of working machines 2 are genuine components or not, in a unified manner. Accordingly, it is possible to monitor groups of components for a plurality of working machines 2 each in an appropriate manner, only by maintaining the contents stored in the component ID storage means in its newest state.

In this embodiment, it is possible to transmit update data for the second component IDs from the component supply management apparatus 3 to the working machine management device 1, and thereby to update the information related to the second component IDs stored in the component ID storage means 1C. Accordingly, it is possible to update the contents stored in the component ID storage means 1C before fitting a component 4 to the working machine 2, so that it is possible to monitor the components 4 in an appropriate manner. In the following, this embodiment will be described in detail.

Embodiment One

Figure 2:
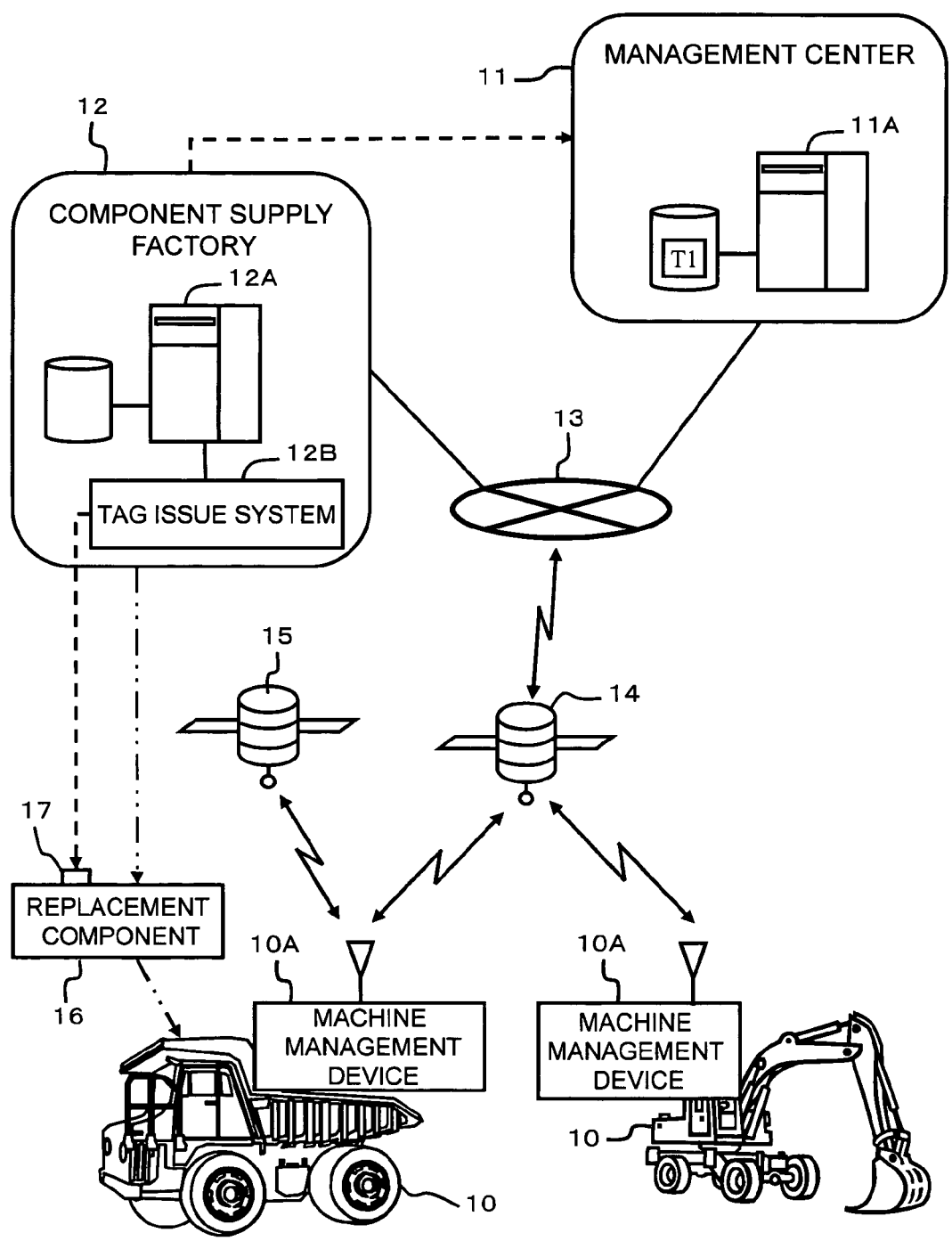
FIG. 2 is a general structural figure of the systems included in this component monitoring system.

A first embodiment of the present invention will now be explained. FIG. 2 is an overall system diagram. As shown in FIG. 1, the component monitoring system for a working machine according to this embodiment may, for example, comprise one or a plurality of working machines 10, a management center 11, a component supply factory 12, a communication network 13, a communication satellite 14, a GPS (Global Positioning System) satellite 15, and so on.

As the working machines 10, for example, working machines such as hydraulic shovels, wheel loaders, bulldozers, motor graders, cranes and the like, haulage vehicles such as dump trucks or the like, or various types of industrial machines such as crushers or generators or the like may be suggested. To each of these working machines 10 there is mounted a machine management device 10A, which collects various types of state of the working machine 10 periodically or at indeterminate times, and transmits this information to the management center 11. The details of these machine management devices 10A will be described in detail hereinafter in connection with FIG. 3; each of the machine management devices 10A is capable of mutual communication with the management center 11 via the communication satellite 14 and the communication network 13. Moreover, the machine management devices 10A ascertain their own current positions by receiving radio waves from the GPS satellites 15. It should be understood that it would also be acceptable to connect together the machine management devices 10A and the management center 11 via some other communication network, such as via a mobile communication network or the public telephone circuit net or the like.

The management center 11 manages the various working machines 10 in a unified manner. A management server 11A of the management server 11 ascertains and manages the states of the working machines 10 by communicating with the machine management devices 10A of the working machines 10. Moreover, the management server 11A manages information such as the product numbers and the manufacturing serial numbers and so on, which are notified from the component supply management server 12A, in a unified manner, and monitors, for each of the working machines 10, whether the components 16 which are being used are genuine components or not.

The management server 11A has a component ID management table T1. The structure of this component ID management table T1 will be described hereinafter with reference to FIG. 6. This component ID management table T1 is updated with the data which is sent, periodically or at indeterminate intervals, from the component supply management server 12A.

The component supply factory 12 produces and supplies various types of components which are used by the working machines 10. As such components 16, engine components which are used by engines, components such as hydraulic components which are used by hydraulic control circuits, and components such as electronic equipment and the like which are used by electrical control circuits, may be cited. It should be understood that although, in the following explanation, as a component 16, the description focuses upon a fuel filter 170 (refer to FIG. 3), the present invention may be applied to various types of components which are used for the working machines 10.

The component supply management server 12A of the component supply factory 12 manages various types of information related to the components 16 which are manufactured. This information which is thus managed may include, for example, product numbers, manufacturing serial numbers, numbers manufactured, manufacturing lot numbers, types of applicable devices, delivery dates, client names, unit prices, product quality data, and the like.

A tag issue system 12B is connected to the component supply management server 12A. This tag issue system 12B issues wireless tags 17 which are provided to the components 16. The tag issue system 12B may, for example, write the product numbers and the manufacturing serial numbers and so on of the components 16 into the wireless tags 17. The wireless tags 17 upon which the product numbers and so on have been written are affixed to the components 16, and are shipped together with the components 16.

The component supply management server 12A is connected via the communication network 13 to the management server 11A of the management center 11, so as to be capable of mutual communication therewith. And periodically, or at indeterminate intervals, the component supply management server 12A transmits the information which is written upon the wireless tags 17, such as product numbers and manufacturing serial numbers and so on, to the management server 11A.

Figure 3:
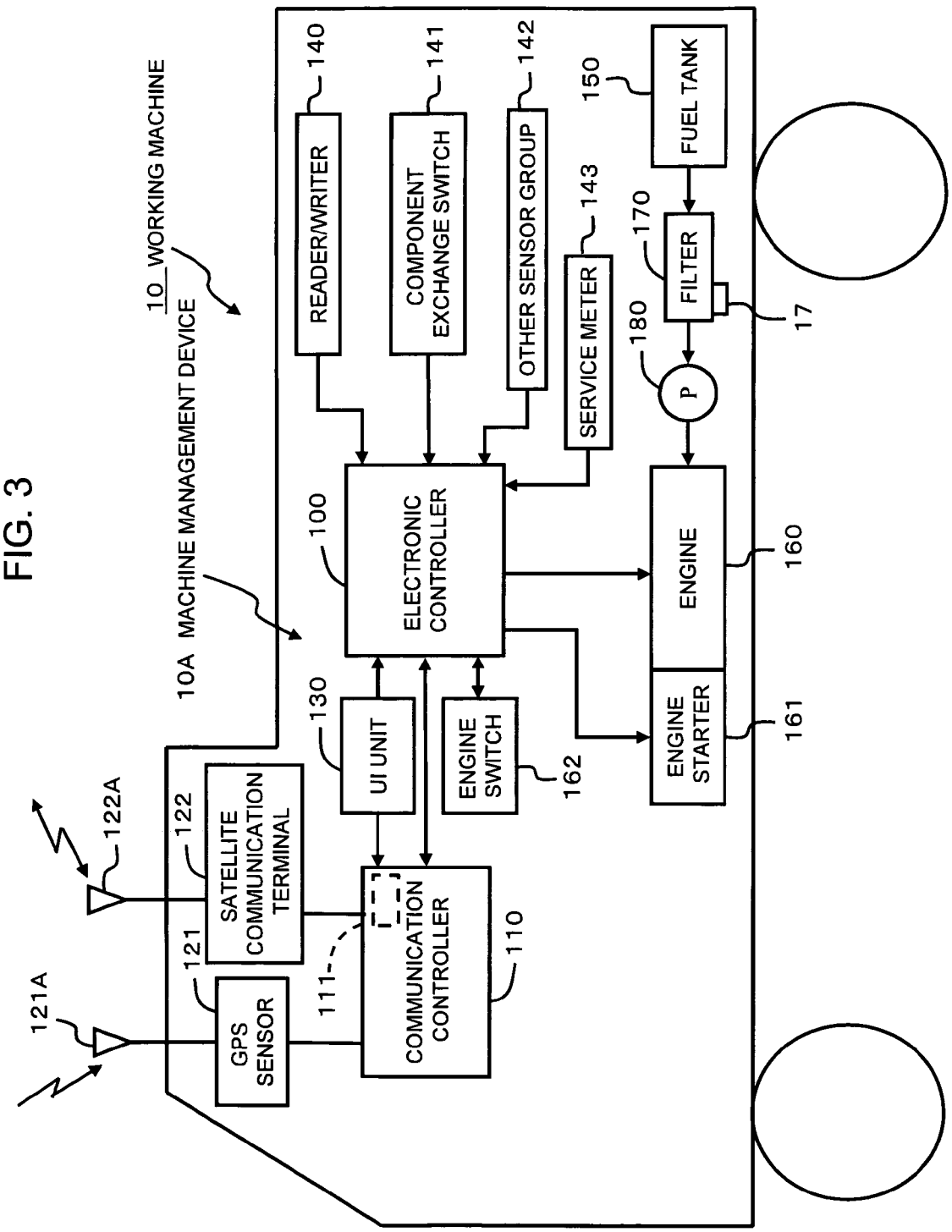
FIG. 3 is a block diagram of a working machine.

FIG. 3 is a block diagram showing the functional structure of a working machine 10. In FIG. 3, the structure of an engine system which comprises a fuel tank 150, an engine 160, a fuel pump 180 and so on, and the structure of a control system which comprises controllers 100 and 110 and so on, are both shown. A first control system will now be explained.

The working machine 10 may, for example, comprise an electronic controller 100, a communication controller 110, a GPS sensor 121, a satellite communication terminal 122, a UI (User Interface) unit 130, a plurality of sensors 140 through 142, and a service meter 143. All or some of these various units may be mutually connected together via one or a plurality of in-vehicle networks. Furthermore it may also be arranged to collect together a plurality of functions or circuits into one, as for example by integrating together the electronic controller 100 and the communication controller 110. It should be understood that the electronic controller 100, the communication controller 110, the various sensors 140 through 142, and the service meter 143 and so on constitute the machine management device 10A.

The communication controller 110, the UI unit 130, the various sensor groups 140 through 142, the service meter 143, an engine starter 161, and an engine switch 162 may be connected to the electronic controller 100.

A reader/writer 140 is a device for performing reading out and writing of information to and from the wireless tag 17. The details of the reader/writer 140 and of a wireless tag 17 will be explained hereinafter with reference to FIG. 4. A component exchange switch 141 is a sensor for detecting component exchange, and detects whether or not a component 16 has been exchanged. For example, this component exchange switch 141 may be constituted by a sensor such as a mechanical switch, a proximity switch, a photoelectric switch or the like. The component exchange switch 141 detects whether or not the component 16 is fitted to the working machine 10. For example, this component exchange switch 141 may output a signal in the ON state when a component 16 is present in a predetermined fitting location on the working machine 10, and may output a signal in the OFF state when no component 16 is present in the predetermined fitting location. Due to this if, after it has been detected that a component 16 has been removed, subsequently it has been detected that a component 16 has been installed, then it is possible to decide that the component 16 has been exchanged.

As the other sensor group 142, for example, an engine rotational speed sensor, a battery voltage sensor, a cooling water temperature sensor or the like may be cited. The service meter 143 is a device which measures and outputs the operating time of the working machine 10.

The electronic controller 100 is built as a computer device which includes a processor and memory and so on, and controls reading and writing of data from and to the wireless tag 17. This electronic controller is able to generate information which specifies the operating time period, the engine rotational speed, the battery voltage, the amount of fuel, the cooling water temperature and so on, as detected by the sensor group described above, and is able to transmit this information to the communication controller 110. This information which specifies the various states and operations of the working machine 10 operating time period, such as the operating time period and the engine rotational speed and so on, will be generically termed the "operating information". This operating information is transmitted to the management server 11A periodically, such as, for example, once per day or the like. Moreover, if a specified event is detected, this information may be transmitted from the machine management device 10A to the management server 11A. The machine management device 10A transmits the first component ID and the product number information and so on which have been read out from the wireless tag 17 to the management server 11a, at the time for periodically transmitting the operating information, or when the component 16 is exchanged.

The communication system of the working machine 10 will now be explained. The GPS sensor 121 comprises a GPS antenna 121A for receiving radio waves from the GPS satellites 15. This GPS sensor 121 measures the current position of the working machine 10, and notifies it to the communication controller 110. And the satellite communication terminal 122 comprises a satellite communication antenna 122A for communication with the communication satellite 14. This satellite communication terminal 122 enables communication between the communication controller 110 and the management server 11A via the satellite communication network. It should be understood that the system is not to be considered as being limited to the satellite communication network; it would also be possible, for example, to establish connection between the communication controller 110 and the management server 11A via a mobile telephone network.

The communication controller 110 controls communication with the management server 11A. This communication controller 110 receives the operating information and so on from the electronic controller 100. Moreover, the communication controller 110 receives position information from the GPS sensor 121 which specifies the current position. The communication controller 110 transmits this operating information and position information to the management server 11A via the satellite communication terminal 122 and the satellite communication circuit, periodically or at indeterminate intervals. For example, the communication controller 110 may transmit the operating information and the position information to the management server 11A once a day, in the time slot when the workplace tasks have ended.

The communication controller 110 may include a rewritable non-volatile storage device 111. For example, the chassis number of the working machine 10, the user name, the operating time period, the working region, the operating history of the working machine 10 and so on may be stored in this storage device 111. The working region is a specified region in which the operation of the working machine 10 is permitted.

The UI unit 130 may, for example, be provided in the vicinity of the driver's seat of the working machine 10. This UI unit 130 may, for example, include an output unit and an input unit. As the output unit, for example, a display device or an audio output device or the like may be suggested. And, as the input unit, for example, keyboard switches, a pointing device, a microphone or the like may be suggested. If some component 16 has been judged by the management server 11A as not being a genuine component, then the UI unit 130 outputs a warning message as a display or by audio.

The engine system of the working machine 10 will now be explained in a simple manner. The fuel tank 150 is a device which stores fuel. The fuel filter 170 is a device for eliminating dirt, dust, moisture, and so on from the fuel stored in the fuel tank 150. The fuel pump 180 supplies fuel filtered by the fuel filter 170 to the engine 160. As will be described hereinafter in connection with FIG. 5, a plurality of fuel filters 170 having different filter diameters may be provided in the fuel supply path.

Figure 4:
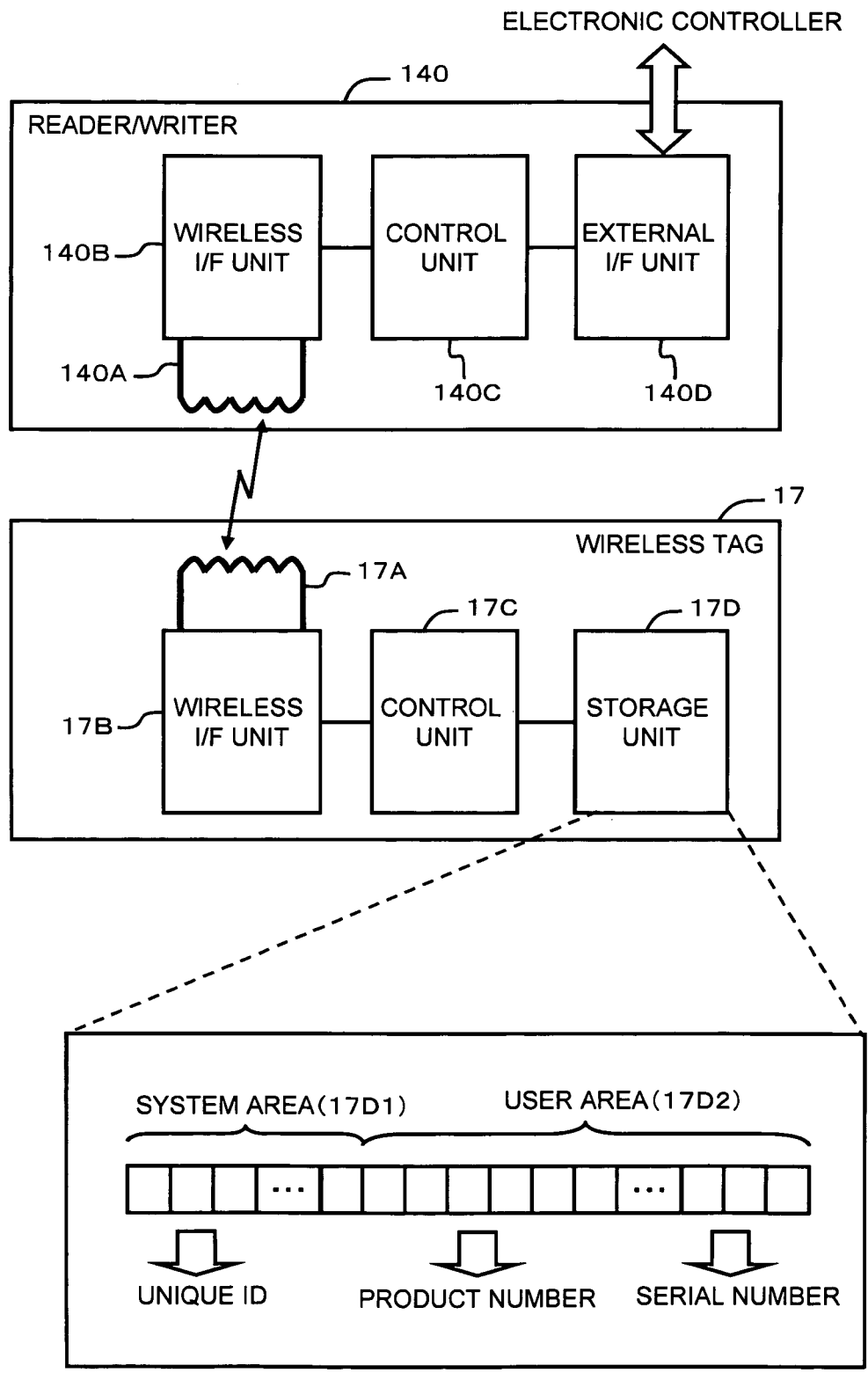
FIG. 4 is a block diagram showing the structure of a wireless tag and of a reader/writer.

FIG. 4 is a block diagram showing the structure of the reader/writer 140 and of a wireless tag 17. The reader/writer 140 may, for example, comprise an antenna 140A, a wireless interface unit 140B, a control unit 140C, and an external interface unit 140D. In the figure, "interface" is abbreviated as "I/F".

The antenna 140a is fitted to the working machine 10 so as to be positioned in the vicinity of an antenna 17A of the component 16. And the wireless interface unit 140B is a circuit for performing communication with the wireless tag 17 via the antenna 140A.

Here, if the wireless tag 17 is built as an RFID tag, then, for example, a comparatively low frequency such as 125 KHz or 13.56 MHz may be selected. In the case of 125 KHz, the distance over which communication is possible between the wireless tag 17 and the antenna 140 is 4~5 cm, while, in the case of 13.56 MHz, the distance over which communication is possible is around 10 cm. While a higher frequency such as 950 MHz or 2.45 GHz may also be used, the higher the frequency becomes, the longer does the straight line transmission distance of the radio waves become. Accordingly it is considered that it is more advantageous to utilize a low frequency in a location such as an engine compartment which has a complicated shape in which various metallic components are disposed. Naturally, the above description related to the selection of frequency is not to be considered as being limitative of the scope of the Claims of this application, and does not exert any influence upon the scope of the rights of the present invention. Moreover, in a case in which a high frequency such as 950 MHz can be used, it would also be acceptable to utilize this high frequency.

The control unit 140C controls the operation of the reader/writer 140. The external interface unit 140D is a circuit which is in charge of communication with the electronic controller 100, which is an external system. The control unit 140C receives read commands or write commands from the electronic controller 100 via the external interface unit 140D. If a read out command has been received, then the control unit 140C reads out the information which is stored in the wireless tag 17 via the wireless interface unit 140B and the antenna 140A, and transfers this information which has been read out to the electronic controller 100. And, if a write command has been received, then the control unit 140C transmits this information to the wireless tag 17 via the wireless interface unit 140B and the antenna 140A, and writes it into the storage unit 17D in the wireless tag 17. It should be understood that, if no information is to be written into the wireless tags 17, it would also be acceptable to arrange to use a dedicated reader device, instead of using the reader/writer 140.

Now the structure of the wireless tag 17 will be explained. This wireless tag may, for example, comprise the antenna 17A, a wireless interface unit 17B, a control unit 17C, and a storage unit 17D. The antenna 17A receives the radio waves generated from the antenna 140A of the reader/writer 140, and also transmits radio waves towards the antenna 140A. The wireless interface unit 17B is a circuit which is in charge of wireless communication with the reader/writer 140. The control unit 17C controls the operation of the wireless tag 17. And the storage unit 17D consists of a rewritable non-volatile memory such as, for example, a flash memory or the like.

The structure of the data which is stored in this storage unit 17D is schematically shown at the lower side of FIG. 4. In the storage unit 17D, for example, there may be provided a system area 17D1 of around several tens of bytes, and a user area 17D2 of from several hundreds to several thousands of bytes. A unique ID or the like for specifying each wireless tag 17 uniquely may, for example, be stored in the system area 17D1. In principle, this system area 17D1 cannot be rewritten by the reader/writer 140.

The user area 17D2 is a storage region which can be utilized by the user who is using the wireless tag 17. In the case of this embodiment, the user who utilizes this user area 17D2 is the vendor of the working machine 10. In this user area 17D2, for example, the product number and the serial number and the like may be stored. The product number is information for specifying the kind of component that the component 16 is. And the serial number is a manufacturing serial number for the component 16, and is identification information for uniquely specifying each of the components 16 within the same component type. The data in this user area 17D2 can be rewritten by the reader/writer 140.

The operation of this wireless tag 17 will now be explained. When a radio wave which includes a control signal is emanated from the antenna 140A of the reader/writer 140, then this radio wave is received by the antenna 17a. The wireless interface unit 17B converts this radio wave received from the reader/writer 140 into a power supply voltage by utilizing, for example, electromagnetic induction or the like. And the control unit 17C accesses the storage unit 17D on the basis of the control signal which is included in the radio wave received from the reader/writer 140, and performs reading out of data therefrom or writing of data thereinto. It should be understood that it would also be acceptable to equip the wireless tag 17 with an individual power supply like, for example, a compact battery or a thermoelectric conversion element or the like.

Figure 5:
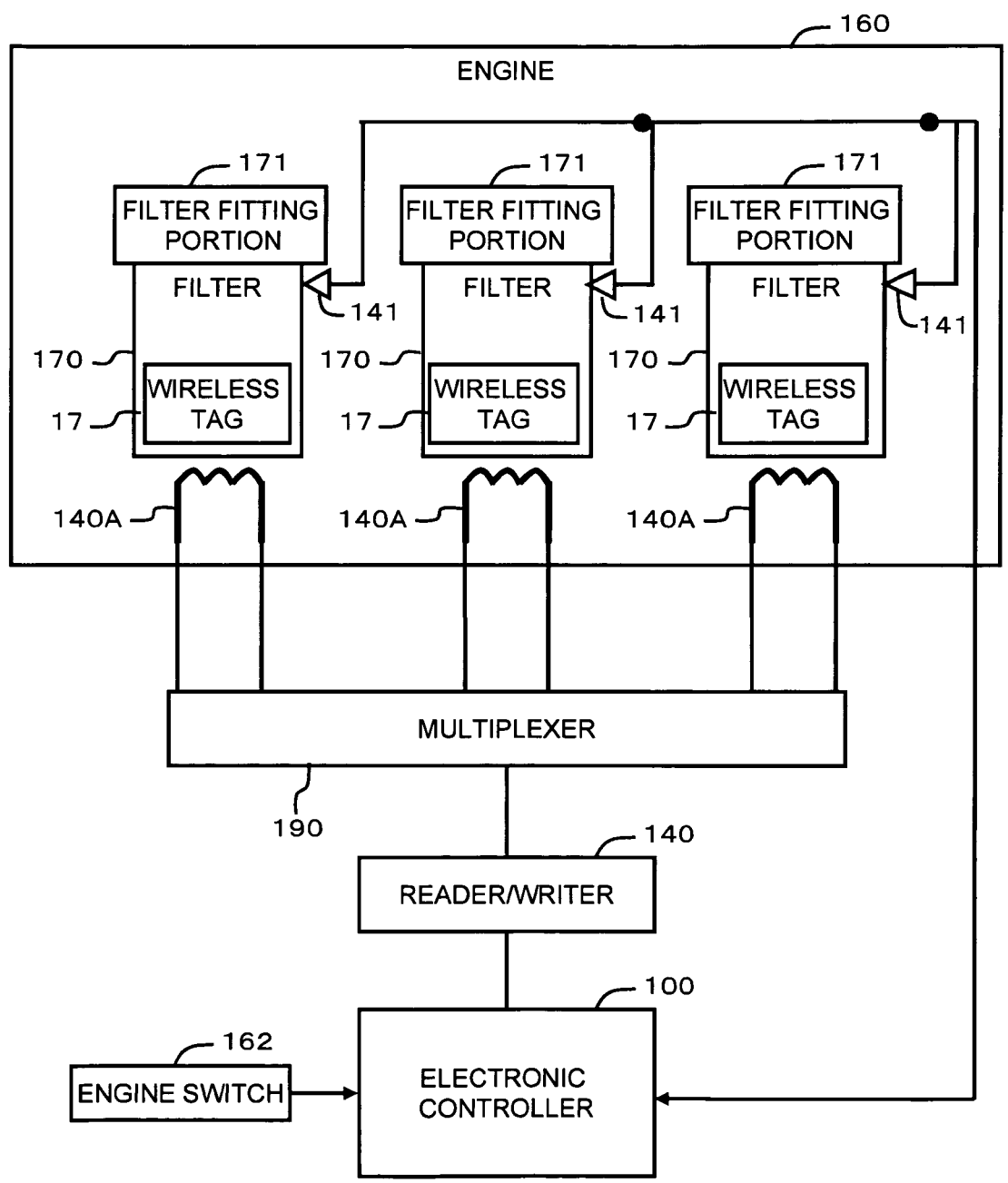
FIG. 5 is a figure for explanation of a case in which communication is performed with wireless tags of a plurality of filters.

FIG. 5 is a figure showing a situation in which communication is performed with a plurality of fuel filters 170, which are taken as components 16. While the fundamental structure of the reader/writer 140 and of a wireless tag 17 has been explained with reference to FIG. 4, it is possible for the reader/writer 140 to perform wireless communication with each of a plurality of wireless tags 17, as shown in FIG. 5.

A plurality of fuel filters 170 are attached to the engine 160 as components 16. A plurality of filter fitting portions 171 are provided to the engine 160, and a fuel filter 170 may be fitted to each of these filter fitting portions 171 so as to be attachable and detachable. A component exchange switch 141 for detecting the installation of a fuel filter 170 is provided in the neighborhood of each of the filter fitting portions 171.

Each of the filters 170 is provided with its own wireless tag 17, in which its product number and serial number and so on are stored. A plurality of antennas 140A, which correspond to the wireless tags 17 are provided so as to be positioned in the neighborhood of the wireless tags 17. Each of these antennas 140A is connected to a multiplexer 190, and the multiplexer 190 is connected to the reader/writer 140. The reader/writer 140 can exchange signals with each of the wireless tags 17, while changing over between the plurality of antennas 140A in order by using the multiplexer 190.

If a plurality of wireless tags 17 are positioned within the range in which signals can be exchanged with one antenna 140A, then it is possible to exchange signals with this plurality of wireless tags 17 with this one antenna 140A.

FIG. 6 shows the component ID management table T1. This component ID management table corresponds to the component ID storage means 1C of the Claims, and is stored in the management server 11A. This component ID management table T1 may, for example, include a product number management portion T11, a serial number management portion T12, and a chassis number management section T13.

The product number management section T11 manages the product numbers of the components 16 which are used with the working machine 10. The serial number management section T12 manages the serial numbers of the components 16 which have been manufactured for these product numbers. Thus, a plurality of serial numbers are put into correspondence with one product number. And the chassis number management section T13 manages the chassis numbers. A chassis number is identification information for identifying the corresponding working machine, and these are put into correspondence with the serial numbers.

At the time point that a component 16 is shipped from the component supply factory 12, it is not possible to put any chassis number into correspondence with the serial number of this component 16, since this component 16 is not yet fitted to any one of the working machines 10. Accordingly, in FIG. 6, "unused" is displayed as the chassis number for the components 16 which have not yet been fitted to any of the working machines 10. It should be understood that this display of "unused" is for the convenience of explanation. Actually, if no chassis number is set in the field for chassis number, then it is understood that this is a component 16 which has a serial number that does not yet correspond to any chassis number. When a component 16 is fitted to a working machine 10, then the chassis number of this working machine 10 to which the component is fitted is set into correspondence with the serial number of this component.

Figure 7:
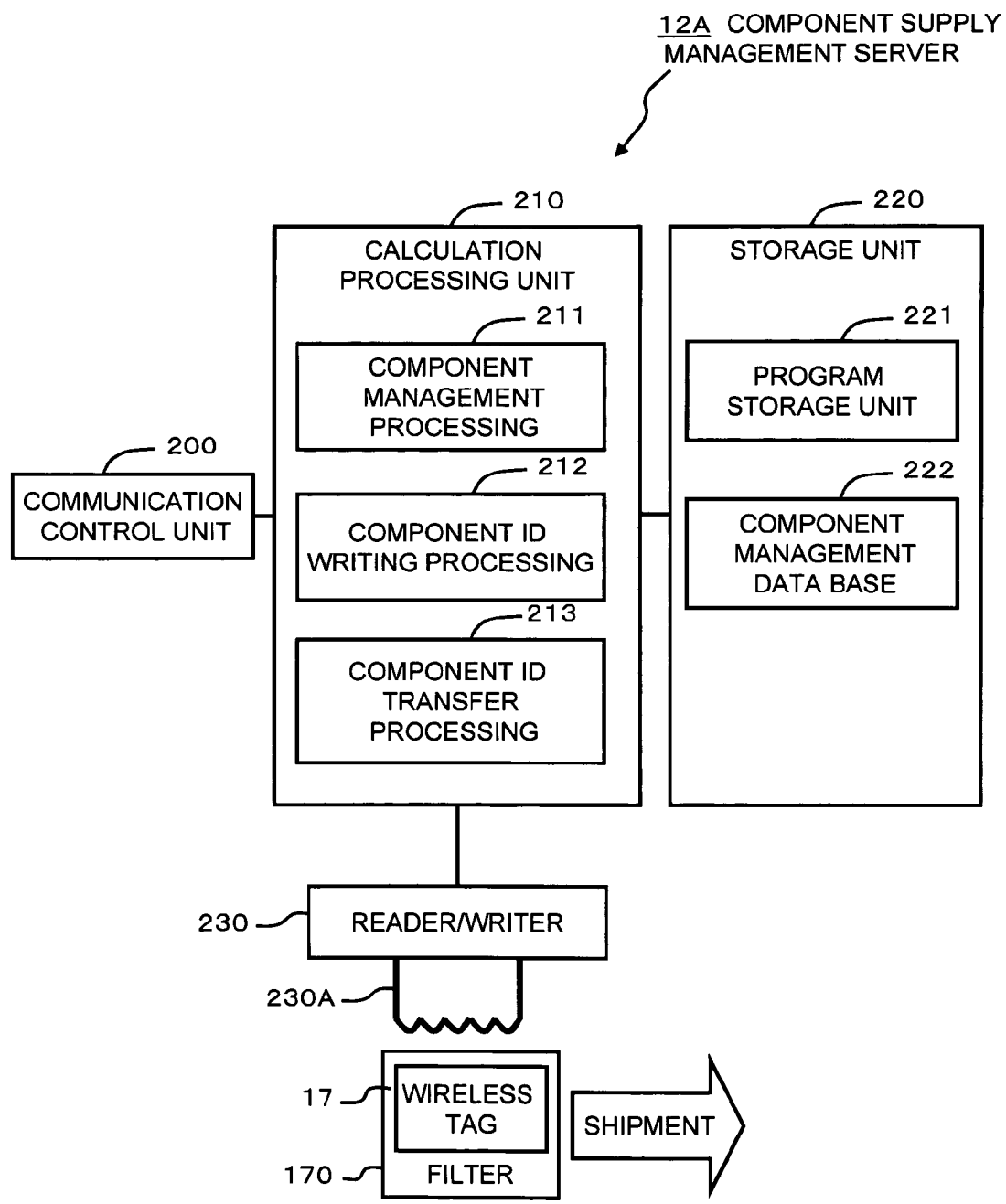
FIG. 7 is a functional structural diagram of a component supply management server.

FIG. 7 shows the functional structure of the component supply management server 12A. This component supply management server 12A may, for example, comprise a communication control unit 200, a calculation processing unit 210, and a storage unit 220.

The communication control unit 200 controls communication via the communication network 13 with the management server 11A of the management center 11. This calculation processing unit 210 executes processing and so on for managing component groups which have been manufactured by executing a program which is stored in the storage unit 220. In the storage unit 220, there are stored a program storage unit 221 which stores the program which is executed by the calculation processing unit 210, and a component management data base 222 and so on.

The calculation processing unit 210, for example, may execute each of component management processing 211, component ID writing processing 212, and component ID transfer processing 213. This component management processing 211 is processing for managing component groups which are manufactured by and shipped from the component supply factory 12. The component ID writing processing 212 is processing for writing the product number and serial number and so on upon a wireless tag 17 via the reader/writer 230. And the component ID transfer processing 213 is processing for transmitting the product numbers and serial numbers and so on of a component group which has been shipped to the management server 11A of the management center 11.

The reader/writer 230 at the lower side of FIG. 7 writes a component ID upon the wireless tag 17 via the antenna 230A. In this component ID there may be included, for example, the product number and the serial number. And the reader/writer 230 includes, not only the component ID writing processing 212, but also the tag issue system 12B in FIG. 2.

Figure 8:
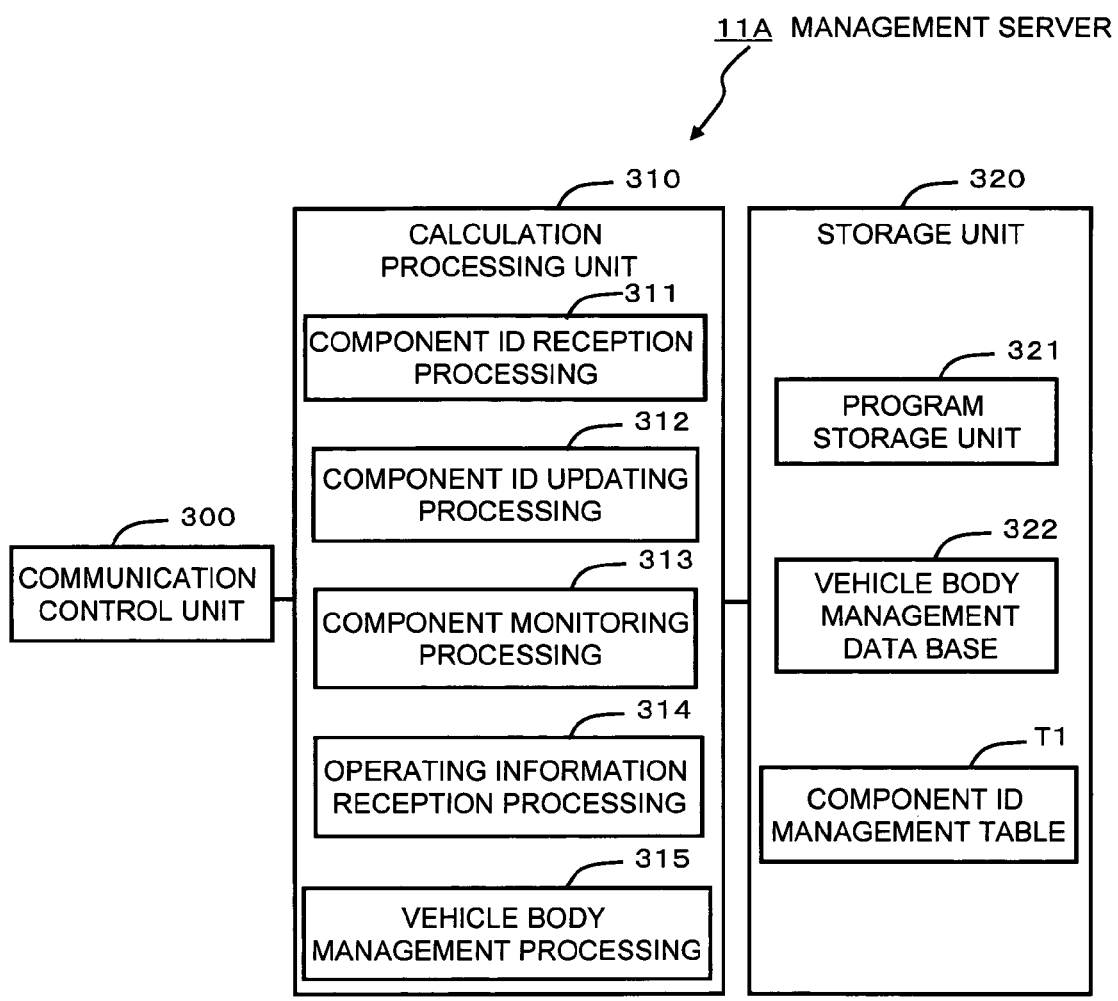
FIG. 8 is a functional structural diagram of a management server.

FIG. 8 shows the functional structure of the management server 11A of the management center 11. This management server 11A may, for example, comprise a communication control unit 300 which controls communication via the communication network 13, a calculation processing unit 310 for processing information which is transmitted and received via the communication control unit 300, and a storage unit 320 which consists of a semiconductor memory or a hard disk device or the like.

In the storage unit 320, there are stored a program storage unit 321 in which various types of computer program executed by the calculation processing unit 310 are stored, and a vehicle body management data base 322 and the component ID management table T1 and so on. The vehicle body management data base 322 is a data structure for managing the operating information for the working machines 10 and their position information and so on.

With the various types of computer program described above, the calculation processing unit 310 executes each of component ID reception processing 311, component ID updating processing 312, component monitoring processing 313, operating information reception processing 314, and vehicle body management processing 315.

The component ID reception processing 311 is processing for receiving component IDs from the component supply management server 12A via the communication network 13. And the component ID updating processing 312 is processing for updating the component ID management table T1 which is stored in the storage unit 320, on the basis of the component IDs which have been received from the component supply management server 12A. For example, product numbers and/or serial numbers which have been newly issued may be stored, and product numbers and/or serial numbers which have become disused may be deleted.

The component monitoring processing 313 is processing for checking the first component IDs which have been sent from each of the working machines 10 and the second component IDs which are stored in the component ID management table T1, and for monitoring whether or not they agree with one another. In this component monitoring processing 313, if a first component ID does not agree with any second component ID, then the occurrence of an abnormal state is notified to the machine management device 10A.

The operating information reception processing 314 is processing for receiving the operating information for each of the working machines 10 which is transmitted from the machine management device 10A. And the vehicle body management processing 315 is processing for managing the states and the positions of the various working machines 10, on the basis of the operating information.

Figure 9:
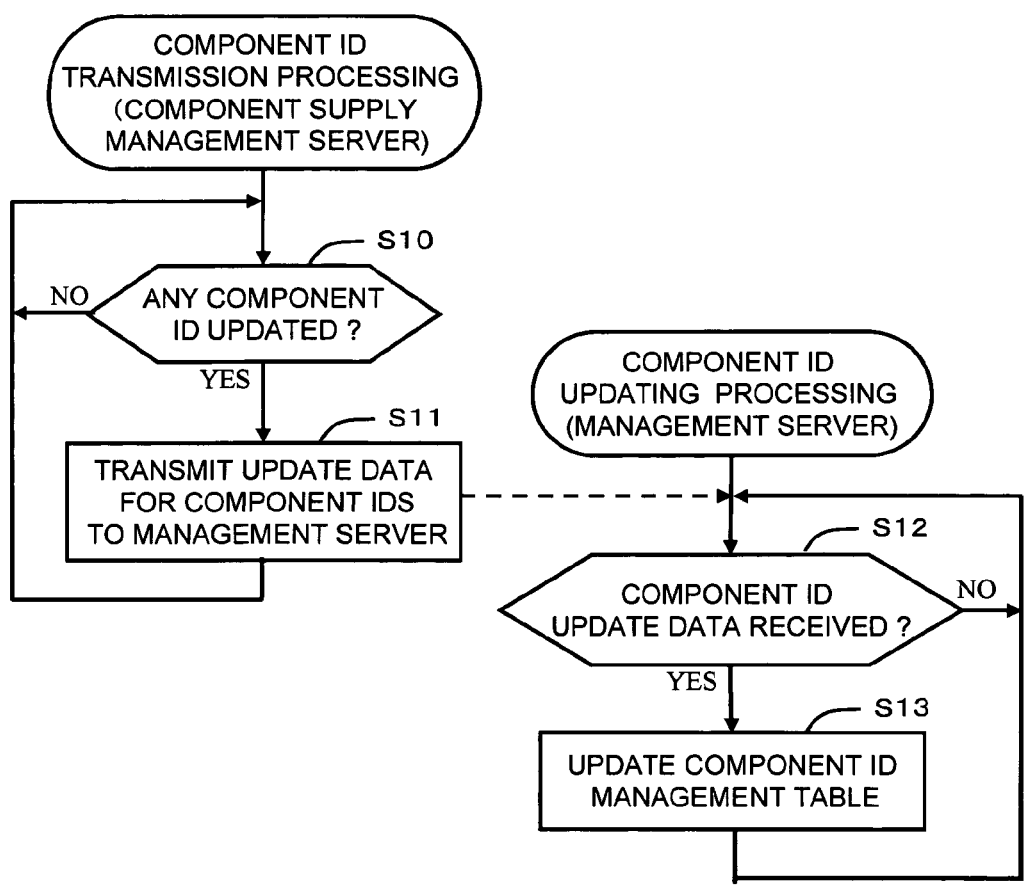
FIG. 9 is a flow chart for component ID updating processing.

FIG. 9 shows the processing for updating the component ID management table T1 which is stored in the management server 11A with data from the supply management server 12A. In the figure, "step" is abbreviated as "S".

The supply management server 12A makes a decision as to whether or not any component ID has been updated (a step S10). The component supply factory 12 manufactures and ships new components 16 every day. Product numbers and serial numbers and so on are set for the components 16 which are shipped. Due to this, new component IDs are created. If a component ID has been updated (YES in the step S10), then the component supply management server 12A transmits update date for the component IDs to the management server 11A (a step S11). By update data is meant data for updating the component ID management table T1 to its newest state, and, finally, this is differential data for the component ID management table T1 which is transmitted to the management server 11A.

If the management server 11A receives update data for the component IDs from the component supply management server 12A (YES in the step S12), then it updates the component ID management table T1 according to this update data (a step S13). By doing this, the management server 11A is able to keep the contents stored in the component ID management table T1 at the newest contents.

Here by updating of the component ID management table T1 is meant, adding the update data which has been received from the component supply management server 12A to the component ID management table T1, and also setting the chassis numbers which correspond to this update data to "unused". In other words, since product numbers and serial numbers relating to newly produced components 16 which are being shipped are both included in the update data, accordingly these product numbers and serial numbers are added to the component ID management table. At this time point, since these newly produced components 16 have not yet been fitted to any working machine 10, accordingly no correspondence is established between their manufacturing serial numbers and any chassis numbers.

Figure 10:
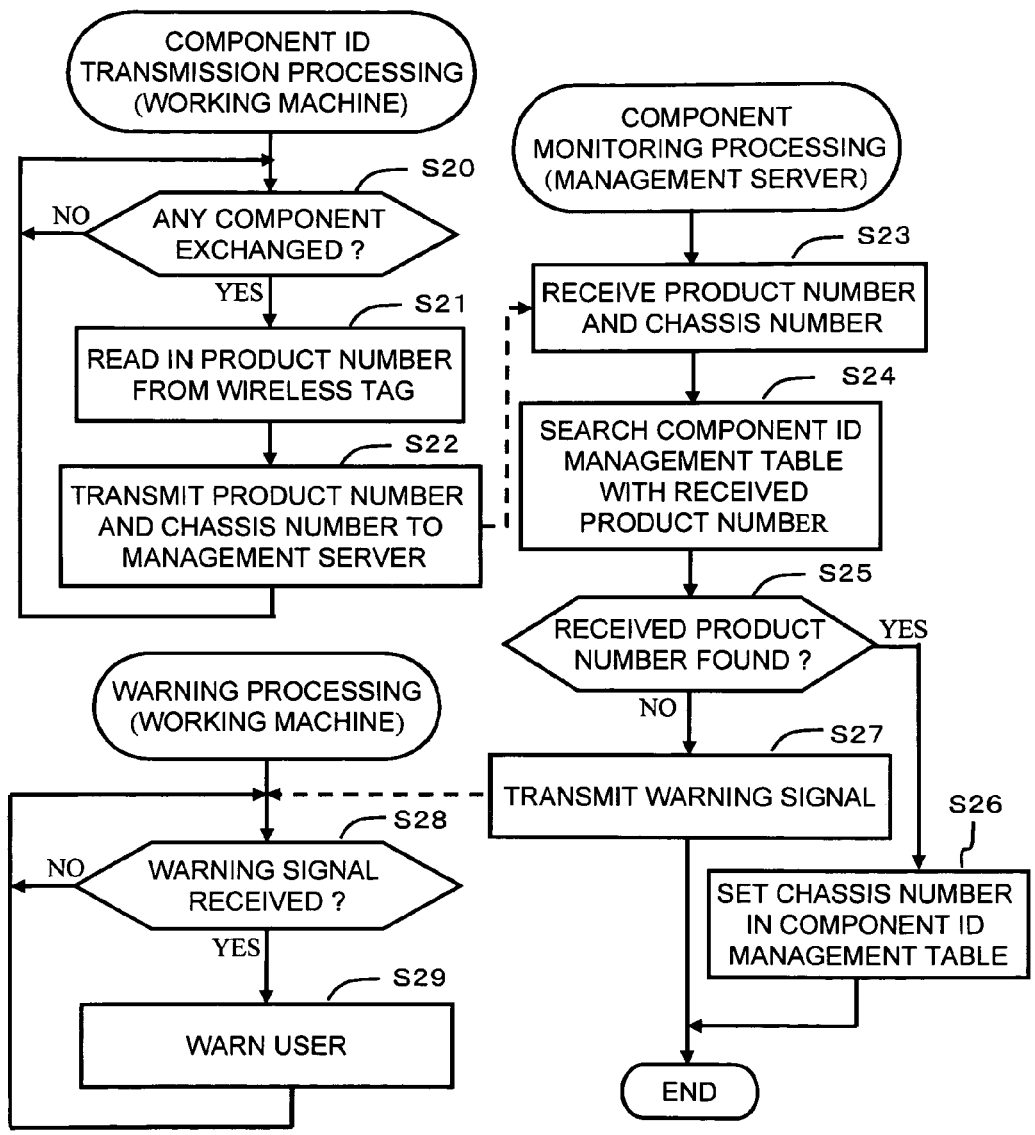
FIG. 10 is a flow chart for component monitoring processing.

FIG. 10 is a flow chart showing the processing for monitoring components of the working machine 11A by the management server 11A. This processing is executed by the management server 11A and the electronic controller 100 as a cooperative task.

First, by reading in the detection signal from the component exchange switches 141, the electronic controller 100 decides whether or not any component 16 (for example, a fuel filter 170) has been exchanged (a step S20). For example if, after a fuel filter 170 has been temporarily removed from one of the filter fitting portions 171, a new fuel filter 170 has been fitted to that filter fitting portion 171, then it is possible to decide that one of the fuel filters 170 has been exchanged.

If exchange of some component 16 has been detected (YES in the step S20), then the electronic controller 100 reads in, via the reader/writer 140, the product number from the wireless tag 17 with which this component 16 is equipped (a step S21). And the electronic controller 100 transmits this product number which has been read in, and the chassis number, to the management server 11A (a step S22).

It should be understood that it would be possible to suggest a plurality of methods as the method for the electronic controller 100 to transmit the product number and the chassis number to the management server 11A. A first method is the case of transmitting the product number and the chassis number to the management server 11A simultaneously with exchange of the component 16. A second method is the method of transmitting the product number and the chassis number to the management server 11A at the time that the operating information is transmitted. Any other method might also be employed. It would also be acceptable to arrange to provide a structure in which the timing for transmission of the product number and the chassis number from the electronic controller 100 to the management server 11A is varied according to the type of the electronic component 16.

Upon receipt of the product number and the chassis number from the working machine 10 (a step S23), the management server 11A searches the component ID management table T1 with this product number which has been received (a step S24). And the management server 11A makes a decision as to whether or not the product number which has been received from the working machine 10 has been found from the component ID management table T1 (a step S25). In other words, the management server 11A makes a decision as to whether or not a product number is present in the component ID management table T1 which agrees with the product number which has been received from the working machine 10.

If the product number which has been received from the working machine 10 has been found from the component ID management table T1 (YES in the step S25), then the management server 11A stores the chassis number which has been received from the working machine 10 in the component ID management table T1 in correspondence with the serial number of the component 16 which has been exchanged (a step S26). By contrast, if it has not been possible to find the product number which has been received from the working machine 10 from the component ID management table T1 (NO in the step S25), then the management server 11A outputs a warning signal to the electronic controller 100 (a step S27). This is because the product number which has been received from the working machine 10 does not agree with any one of the product numbers which are registered in the component ID management table T1.

Upon receipt of a warning signal from the management server 11A (YES in the step S28), the electronic controller 100 issues a warning to the user (a step S31). This warning is provided by outputting, via the UI unit 130, a message such as, for example, "The fuel filter which has been exchanged is not a genuine component. Please exchange it for a genuine component." or the like. In this case, the user is the person who has exchanged the component of the working machine 10, or the like.

As has been described in detail above, in this embodiment, it is possible for the management server 11A to decide whether or not a component 16 which is mounted to the working machine 10 is a genuine component, at the time of component exchange. And, if it has been decided that some component 16 other than a genuine component is installed, then, for example, it is possible to notify a warning message to the user. Accordingly, it is possible to issue a warning to the user with regard to the use of a counterfeit product or the like. Due to this, it is possible to suppress the occurrence of claims, and it is possible to maintain the reliability of the working machine 10.

And, in this embodiment, a decision is made as to whether or not the product number which has been written into the wireless tag 17 is a genuine product number, at the time that the component 16 is exchanged. Accordingly, it is possible to decide whether or not just that component 16 which has been exchanged is a genuine component or not, directly at the time point of that exchange. Due to this, it is possible to detect whether or not this component is a genuine component at an early stage, with a comparatively simple control structure.

Moreover, in this embodiment, whether a plurality of components 16 which are used with a plurality of working machines 10 are genuine components or not, is managed by the management server 11A in a unified manner. Accordingly, it is possible to monitor groups of components for a plurality of working machines 10 in individually appropriate manners, by only keeping the contents stored in the component ID management table T1 in the newest up to date state.

Furthermore, in this embodiment, the update data is transmitted from the component supply management server 12A to the management server 11A, and the product numbers and serial numbers which are stored in the component ID management table T1 are updated. Accordingly, it is possible to update the contents stored in the component ID management table T1 before fitting the components 16 to the working machine 10, so that it is possible to monitor the components 16 in an appropriate manner.

Embodiment Two

Figure 11:
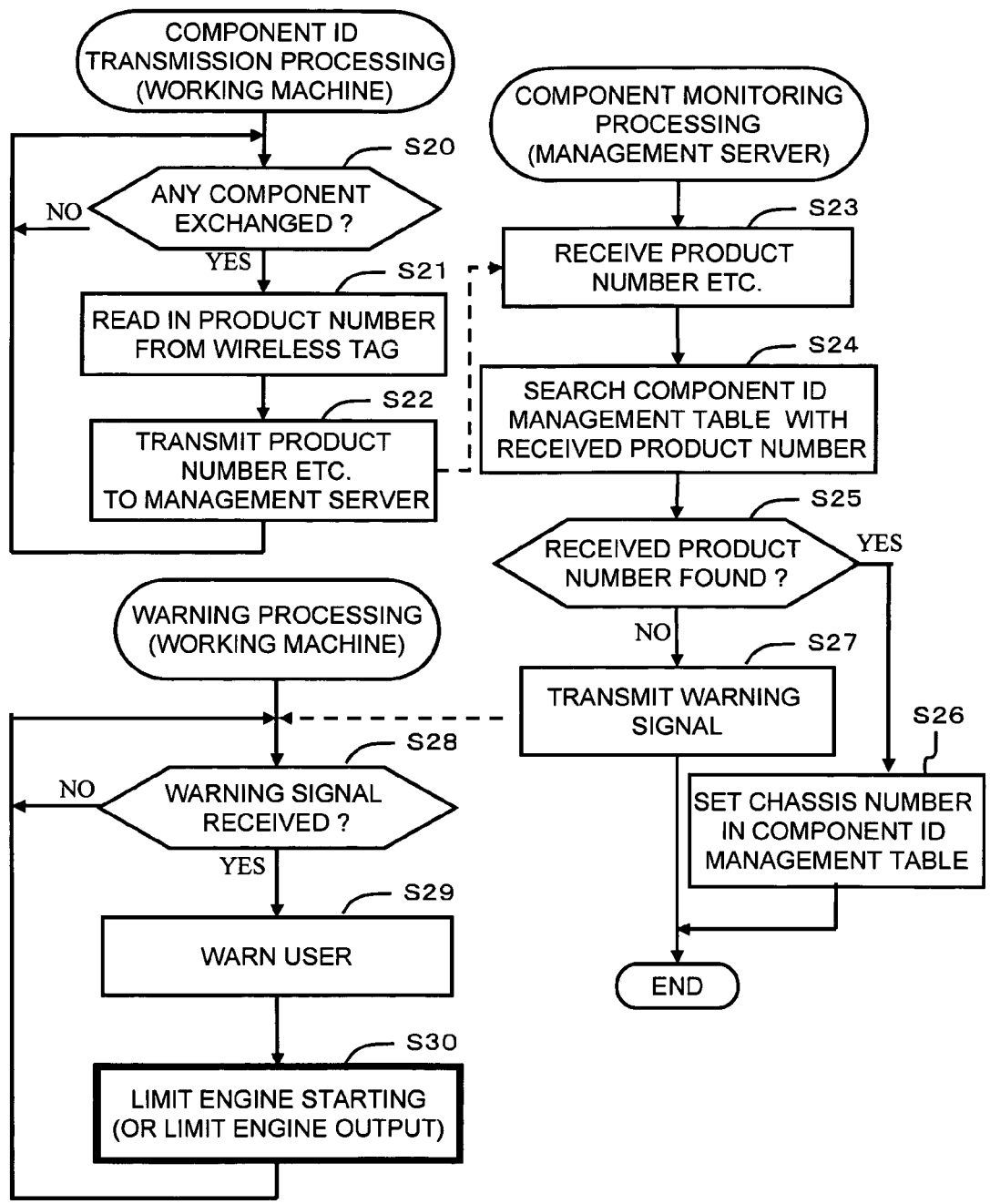
FIG. 11 is a flow chart for component monitoring processing according to a second embodiment.

FIG. 11 is a flow chart showing a method of component monitoring according to a second embodiment of the present invention. For each of the following embodiments, including this embodiment, the explanation will center upon the aspects of difference from the first embodiment. In this embodiment, upon receipt of a warning signal from the management server 11A (YES in the step S28), the electronic controller 100 of the working machine 10 not only issues a warning to the user (a step S29), but also limits starting of the engine 160 (a step S30). It would also be acceptable to provide a structure in which, instead of limiting the starting of the engine 160, its output is limited. For example, if a counterfeit product is fitted, it would be acceptable to limit the engine rotational speed to a low speed or to a medium speed.

This embodiment having the above structure provides similar advantageous effects to those of the first embodiment. In addition thereto, since with this embodiment the starting of the engine is prohibited or the engine output is limited if some component 16 which is not a genuine component is fitted, accordingly it is possible to prevent the working machine from being used in a normal manner with this inferior counterfeit product still installed. Accordingly, it is possible to prevent decrease of the performance of the working machine 10, and to suppress the occurrence of claims, so that it is possible to maintain the reliability of the working machine 10.

Embodiment Three

Figure 12:
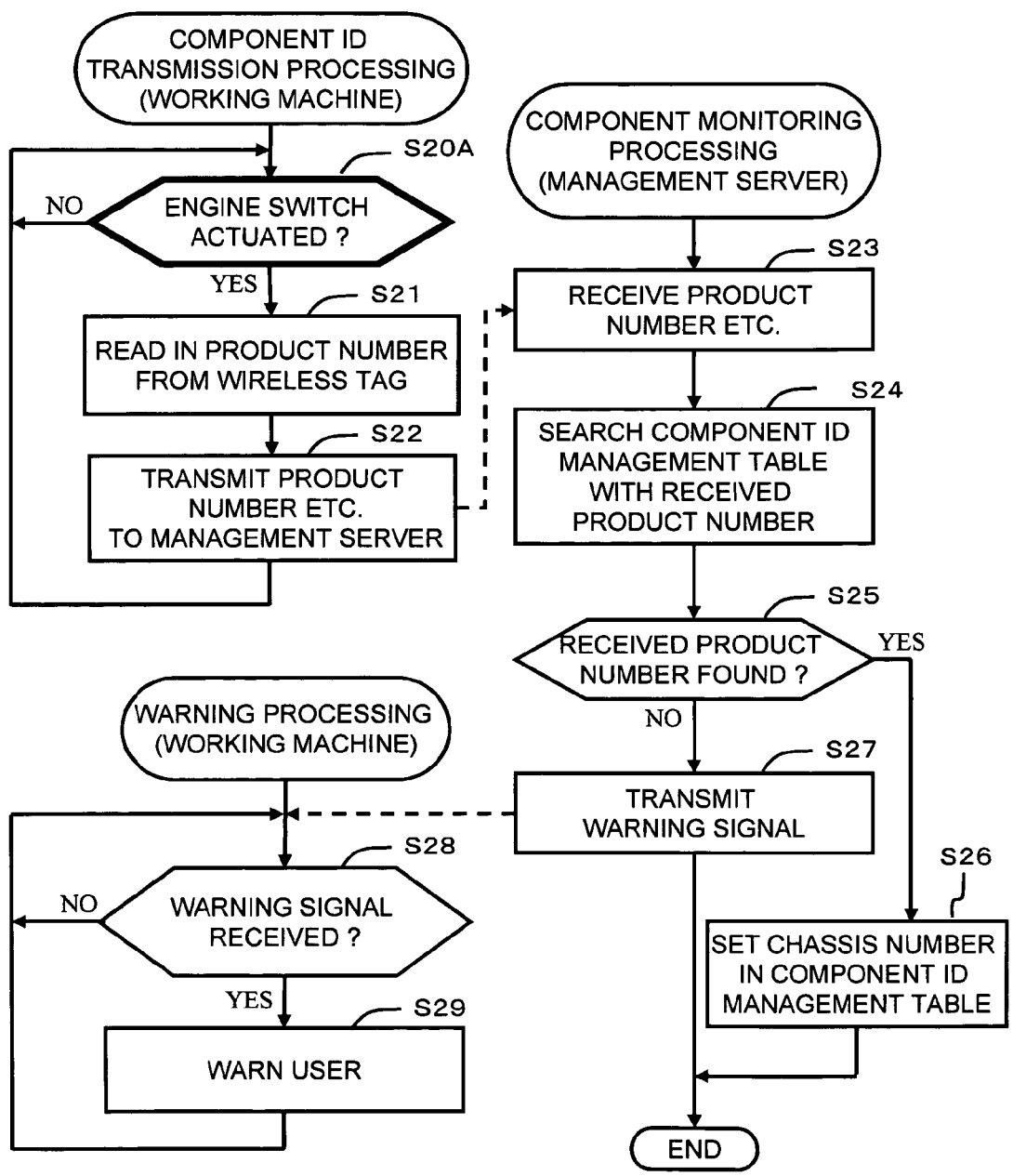
FIG. 12 is a flow chart for component monitoring processing according to a third embodiment.

A third embodiment will now be explained on the basis of FIG. 12. In this embodiment, when the engine switch 162 is actuated, a decision is made as to whether genuine components are being used or not. FIG. 12 shows the component monitoring processing which is executed by the component monitoring system for a working machine according to this embodiment.

In this embodiment, the electronic controller decides whether or not the engine switch 162 has been actuated (a step S20A). And, if the engine switch 162 is being actuated (YES in the step S20A), then the electronic controller 100 reads in the various product numbers of the components 16 from their wireless tags 17 via the reader/writer 140 (a step S21), and transmits these product numbers and the chassis number to the management server 11A (a step S22).

Upon receipt of the product numbers and the chassis number (a step S23), the management server 11A searches the component ID management table T1 with the product numbers which have been received from the working machine 10 (a step S24), and makes a decision as to whether or not the product numbers which have been received can be found from the component ID management table T1 (a step S25). And, if it is not possible to find some product number which has been received from the component ID management table T1 (NO in the step S25), then a warning signal is outputted to the electronic controller 100 of the working machine 10 (a step S27).

This embodiment having the above structure also provides similar advantageous effects to those of the first embodiment. In addition thereto, with this embodiment, each time the starting of the engine is requested, it is possible to test whether or not each component is genuine, so that it is possible to enhance the reliability.

Embodiment Four

A fourth embodiment will now be described on the basis of FIGS. 13 through 15. In this embodiment, the product number and the serial number are checked at the time of component exchange, and moreover a serial number is deleted from the component ID management table T1 once the component has been used.

Figure 13:
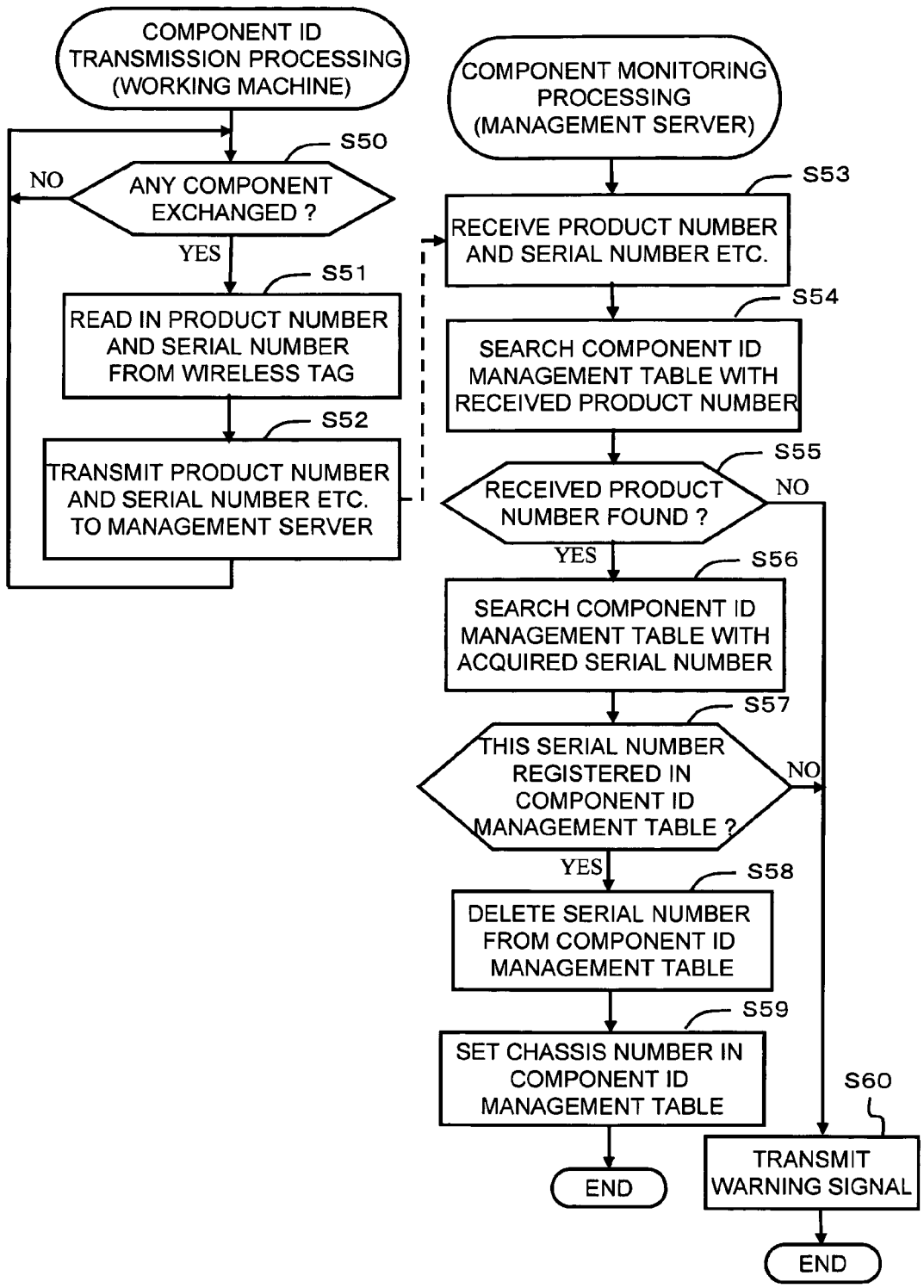
FIG. 13 is a flow chart for component monitoring processing according to a fourth embodiment.

FIG. 13 is a flow chart showing the component monitoring processing which is executed by the component monitoring system according to this embodiment. The electronic controller 100 makes a decision as to whether or not any component has been exchanged (a step S50).

If some component has been exchanged (YES in the step S50), then the electronic controller 100 reads in the product numbers and the serial numbers from the wireless tags 17 via the reader/writer 140 (a step S51). And the electronic controller 100 transmits the product number and the serial number which correspond to that component 16 which has been exchanged to the management server 11A (a step S52). It should be understood that, when thus transmitting the product number and the serial number, the electronic controller 100 transmits them together with the chassis number.

And, upon receipt of the product number and the serial number from the electronic controller 100 (a step S53), the management server 11A searches the component ID management table T1 with the product number which has been received (a step S54).

The management server 11A then makes a decision as to whether or not it has been possible to find the product number which has been received from the component ID management table T1 (a step S55). And, if it has been possible to find the product number which has been received from the component ID management table T1 (YES in the step S55), then the management server 11A searches the component ID management table T1 with the serial number which was received in the step S53 (a step S56). Here, it is not necessary to search the entire component ID management table T1; it is sufficient only to search entries in the component ID management table T1 having the matching product number.

If the serial number which is stored in the wireless tag 17 (in other words the serial number which was received in the step S53) is registered in the component ID management table T1 (YES in the step S57), then the management server 11A deletes that serial number from the component ID management table T1 (a step S58). Moreover, the management server 11A stores the chassis number in the component ID management table T1 (a step S59). It should be understood that, in this embodiment, the chassis number is not used in the decision as to whether a component is genuine or not. In FIG. 15, a situation is shown in which certain serial numbers which have been utilized are deleted from the component ID management table T1.

By contrast, if it has not been possible to find the product number which has been received in the step S53 from the component ID management table T1 (NO in the step S55), then, since it is considered that the component 16 which has been exchanged is a counterfeit product, accordingly the management server 11A transmits a warning signal to the electronic controller 100 (a step S60).

If, even though the product number which was received in the step S53 is stored in the component ID management table T1, the serial number which was received in the step S53 is not registered in the component ID management table T1 (NO in the step S57), then the management server 11A outputs a warning signal (a step S60), since it is considered that this is a counterfeit product having a wireless tag 17 which has been illegally copied.

When, as described above, a component 16 which is new production has been installed to the working machine 10, then the serial number of this component 16 is deleted from the component ID management table T1. If a wireless tag 17 possessed by some component 16 is illegally copied in the course of the trade process, and this illegally copied wireless tag 17 has been attached to a counterfeit product, then the decision in the step S57 is "NO" since the serial number of this counterfeit product is deleted from the component ID management table Ti, and accordingly a warning signal is outputted (in the step S60).

Figure 14:
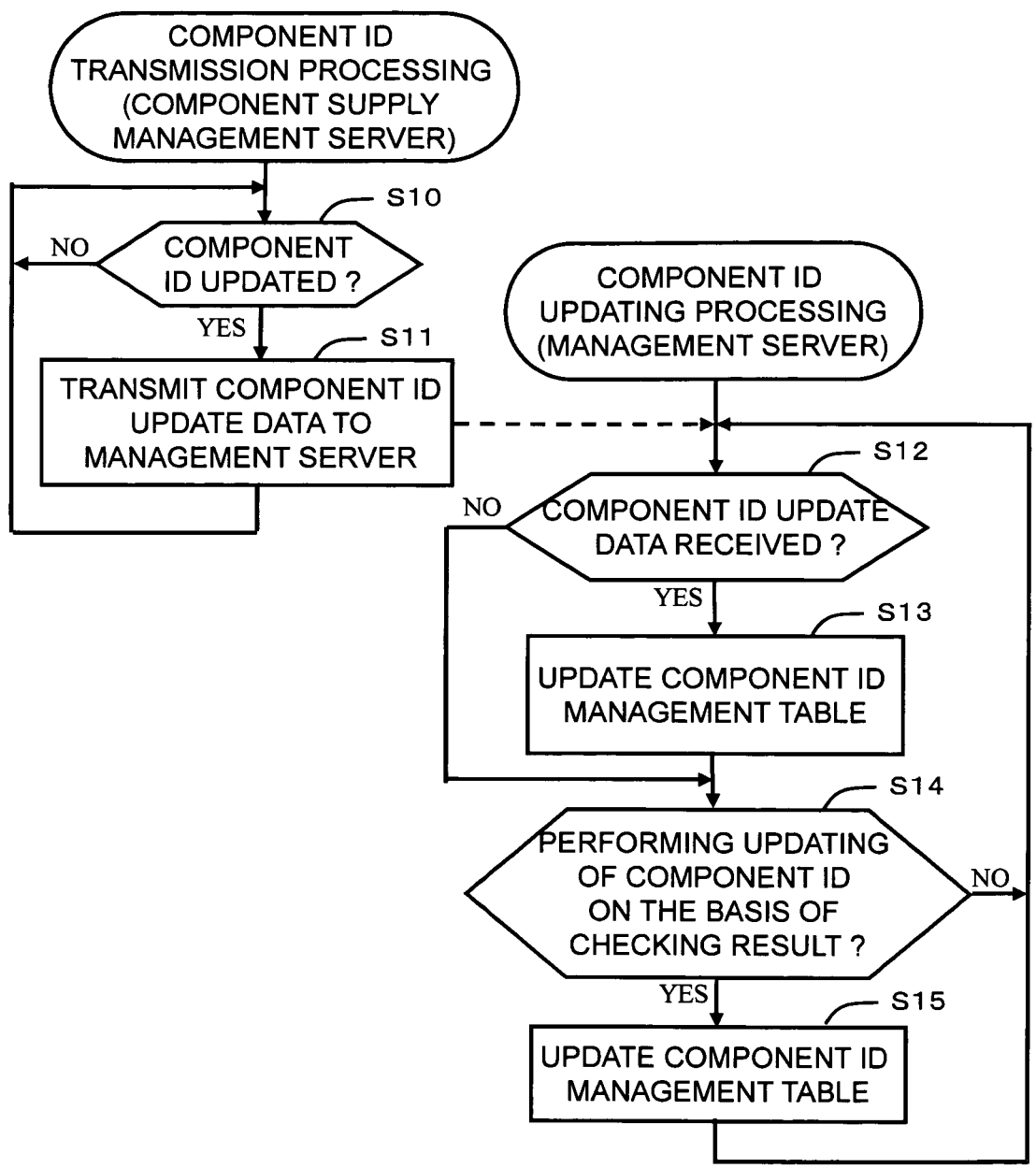
FIG. 14 is a flow chart for component ID updating processing.

FIG. 14 is a flow chart showing the processing for updating the component ID management table T1. This flow chart includes steps (S10 through S13) which are common with the flow chart shown in FIG. 9. To omit the explanation of these common steps and only explain the steps which are characteristic of this embodiment, the management server 11A decides whether or not to perform updating of the component IDs on the basis of the results of checking the product numbers and serial numbers (a step S14).

In other words, a decision is made as to whether or not the deletion in the step S58 of FIG. 13 of the serial number which has been utilized has been confirmed. If the deletion of the serial number which has been utilized is confirmed (YES in the step S14), then the management server 11A deletes this serial number which has been utilized from the component ID management table T1 (a step S15).

This embodiment having the above structure provides similar advantageous effects to those of the first embodiment. In addition thereto, since with this embodiment the serial number of a component 16 is deleted from the component ID management table T1 as soon as it has once been used, accordingly it is possible to prevent the usage of a counterfeit product having a wireless tag 17 which has been illegally copied, before it even happens. For example, in the case of a malicious user, it is considered that he may purchase only one genuine component, and then may copy the contents stored in the wireless tag 17 which is attached to the genuine component. This would be because, by thus attaching a wireless tag which has been illegally copied to a counterfeit product, it would be possible to reduce the maintenance cost by using counterfeit products from then on. However in this embodiment it is possible to eliminate this type of illegal action, since a serial number which has been already used is deleted from the component ID management table T1.

Furthermore, in this embodiment, it is possible to prevent a wireless tag 17 which has been illegally copied being used with a different working machine 10, since the component ID management table T1 is managed by the management server 11A, and a serial number which has been used by any one of the working machines 10 is deleted from the component ID management table T1, and accordingly it is possible to enhance the reliability and the convenience of use.

Embodiment Five

A fifth embodiment will now be explained on the basis of FIG. 16. In this embodiment, the product numbers, serial numbers, and chassis number are confirmed when the engine switch is actuated, and moreover, if no chassis number is yet set, then the chassis number is set.

Figure 16:
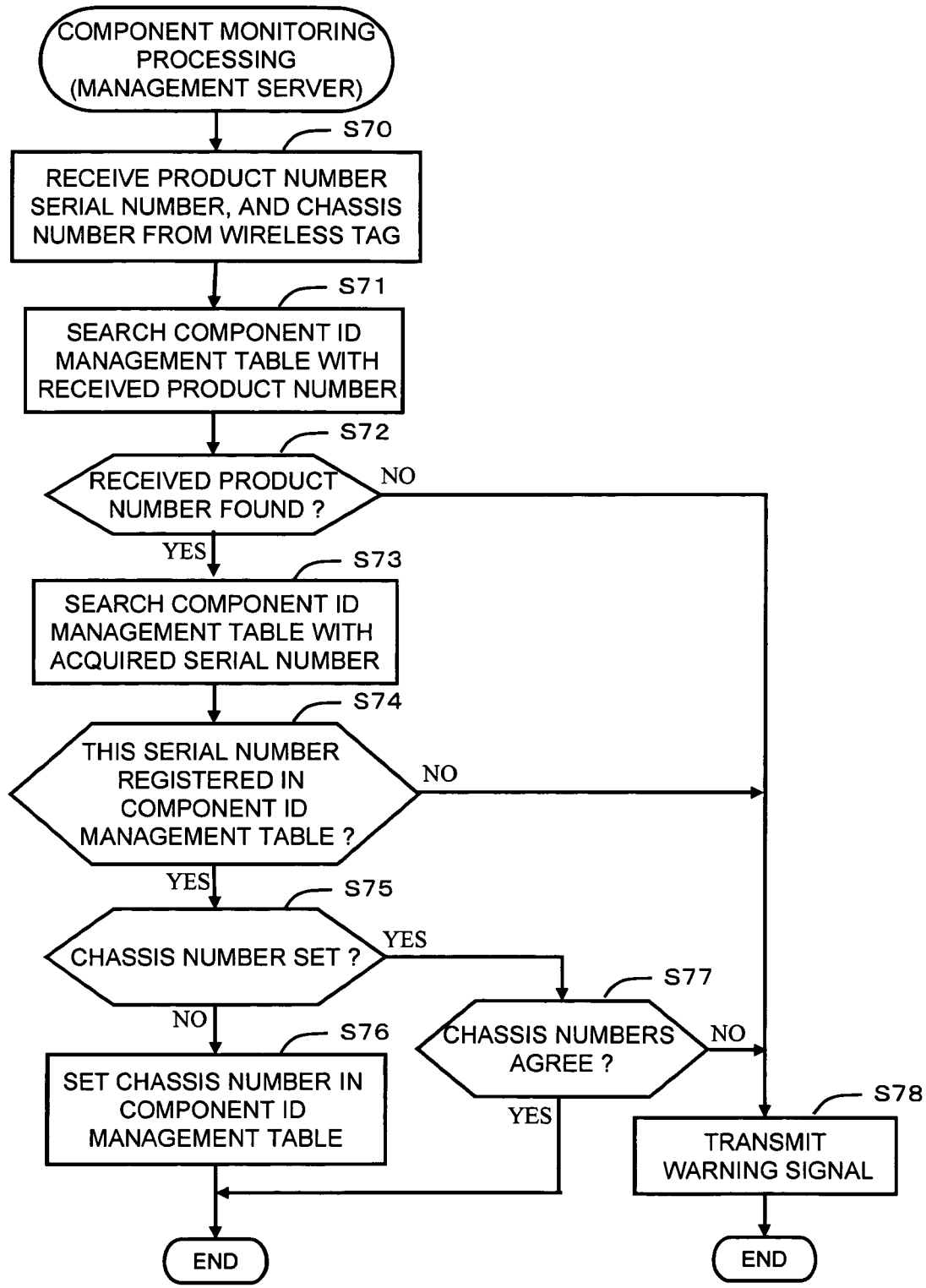
FIG. 16 is an explanatory figure for a component ID management table according to a fifth embodiment.

FIG. 16 is a flow chart showing the component monitoring processing according to this embodiment. The electronic controller 100 takes the opportunity presented by operation of the engine switch 162 to read in the product number and the serial number of each of the components 16, and to transmit them to the management server 11A. The processing performed by the electronic controller 100 is the same as the steps S50 through S52 shown in FIG. 13, and accordingly is omitted from the figure for the sake of convenience.

Upon receipt of the product number and the serial number of each component 16 from the electronic controller 100 (a step S70), the management server 11A searches the component ID management table T1 with these product numbers which have been received (a step S71). And the management server 11A decides, for each of the components 16, whether or not its product number which was received in the step S70 can be found from the component ID management table T1 (a step S72).

If every one of the product numbers which was received in the step S70 agrees with some one of the product numbers stored in the component ID management table T1 (YES in the step S72), then the management server 11A searches the component ID management table T1A with the serial numbers which were received in the step S70 (a step S73). And the management server 11A decides whether or not the serial number which is stored in each of the wireless tags 17 is registered in the component ID management table T1 (a step S74).

If a serial number which is stored in a wireless tag 17 is registered in the component ID management table T1 (YES in the step S74), then the management server 11A makes a decision as to whether or not a chassis number is set for this serial number (a step S75). By a chassis number being set for this serial number, is meant that a chassis number is stored in correspondence with this serial number in the component ID management table T1.

If this is a genuine newly produced component, then no chassis number will correspond to it. Thus, if no chassis number is set in correspondence with this serial number (YES in the step S75), then the management server 11A sets the chassis number into the component ID management table T1 (a step S76).

On the other hand, if some product number which was received in the step S70 does not correspond to any of the product numbers which are stored in the component ID management table T1 (NO in the step S72), then, since the component for which the product number does not agree is a counterfeit product, accordingly the management server 11A outputs a warning signal to the electronic controller 100 (a step S78), thus issuing a warning to the user.

And if a chassis number is set (NO in the step S75), then the management server 11A makes a decision as to whether or not the chassis number which was received in the step S70 and the chassis number which is stored in the component ID management table T1 agree with one another (a step S77). If these two chassis numbers agree with one another (YES in the step S77), then the management server 11A terminates this processing, since this is the case in which a genuine component 16 which was initially installed upon the working machine 10 is being used just as it is.

By contrast, if the two chassis numbers do not agree with one another (NO in the step S77), then it is considered that a counterfeit product having a wireless tag which has been illegally copied is being used. Thus, the management server 11A transmits a warning signal to the electronic controller 100. In other words, in this embodiment, if the same product number and serial number have been transmitted to the management server from different working machines 10, then the chassis numbers are investigated. And a warning signal is transmitted to the electronic controller 100 of that working machine 10 which has a chassis number which is different from the chassis number which is registered in the component ID management table T1.

This embodiment having the above structure provides similar advantageous effects to those of the first embodiment. In addition thereto, with this embodiment, in a similar way to the case with the fourth embodiment, it is possible to prevent the usage of a counterfeit product having a wireless tag 17 which has been illegally copied, before it even happens.

It should be understood that the embodiments described above are only given by way of example for explanation of the present invention, and are not intended to limit the scope of the present invention in any way. The present invention may be implemented in various manners other than those shown in the embodiments described above, provided that its gist is not deviated from.

The invention claimed is:

1. A system for monitoring a component which can be exchangeably mounted to a working machine, comprising a control device which is provided to said working machine, and a management device which is connected to said control device via a communication network so as to be capable of mutual communication therewith, wherein:
    a wireless tag, in which first component identification information for identifying this component is stored, is provided in advance to said component, said first component identification information including a first product number and a first serial number;
    said control device comprises:
    a checking timing detection means for detecting whether or not a checking timing, which has been set in advance, has arrived; and
    a component identification information acquisition means which, if said checking timing has arrived, acquires said first component identification information from said wireless tag via an information reading means, adds a first chassis number corresponding to said working machine to said first component identification information and transmits said first component identification information including a combination of said first product number, said first serial number and said first chassis number to said management device via said communication network;
    and said management device comprises:
    a component information management means for managing second component identification information related to genuine components, said second component identification information including a second product number and a second serial number together with a second chassis number corresponding to said second component identification information;
    a component monitoring means for monitoring genuine components which decides:
        whether said first product number which has been received from said control device and said second product number which is managed by said component information management means agree with one another or not, and
        if said first product number and said second product number do not agree with one another, outputs a decision result to the effect of non-agreement,
        whether said first serial number which has been received from said control device and said second serial number which is managed by said component information management means agree with one another or not, and if said first serial number and said second serial number do not agree with one another, outputs another decision result to the effect of non-agreement, whether said first chassis number which has been received from said control device and said second chassis number which is managed by said component information management means agree with one another or not, and if said first chassis number and said second chassis number do not agree with one another, outputs a further decision result to the effect of non-agreement; and if said first chassis number and said second chassis number agree with one another, terminates the monitoring of genuine components; and an updating means which, if it has been decided by said component monitoring means that said first serial number and said second serial number agree with one another, deletes the second serial number from said component information management means so that said second serial number, for which this agreement has been decided, is not re-used by said component monitoring means.

2. The system for monitoring a component according to claim 1, wherein said working machine is physically separated from said management device and said communication network is a wireless communication network.

3. A management device for a working machine which is connected via a communication network to a control device provided to said working machine so as to be capable of mutual communication therewith, comprising:

a wireless tag, in which is stored first component identification information for identifying a component which can be exchangeably mounted to said working machine, is provided in advance to this component, said first component identification information including a first product number and a first serial number;

said control device including a checking timing detection means for detecting whether or not said checking timing has arrived for deciding whether or not a component is a genuine component, and a component identification information acquisition means;

said component identification information acquisition means, after said checking timing has arrived, acquiring said first component identification information from said wireless tag via an information reading means, adding a first chassis number corresponding to said working machine to said first component identification information and transmitting said first component identification information including a combination of said first product number, said first serial number and said first chassis number to said management device via said communication network;

a component information management means for managing second component identification information related to genuine components, said second component identification information including a second product number and a second serial number together with a second chassis number corresponding to said second component identification information;

a component monitoring means for monitoring genuine components, which receives said first component identification information and said first chassis number transmitted by said control device and compares said first component identification information and first chassis number with said second component identification information and said second chassis number which is managed by said component information management means, and said component monitoring means:

if said first product number and said second product number do not agree with one another, outputs a warning signal of non-agreement, if said first chassis number and said second chassis number do not agree with one another, outputs another warning signal of non-agreement; and if said first chassis number and said second chassis number agree with one another, terminates the monitoring of genuine components; and an updating means which, if said first serial number and said second serial number agree with one another based on the comparison by said component monitoring means, deletes the second serial number from said component information management means so that said second serial number is not re-used h said component monitoring means.

4. The system for monitoring a component according to claim 3, wherein said working machine is physically separated from said management device and said communication network is a wireless communication network.

\* \* \* \* \*